United States Patent
Energin et al.

(10) Patent No.: US 10,606,609 B2
(45) Date of Patent: Mar. 31, 2020

(54) CONTEXT-BASED DISCOVERY OF APPLICATIONS

(71) Applicant: Microsoft Technology Licensing, LLC, Redmond, WA (US)

(72) Inventors: Semih Energin, Seattle, WA (US); Anatolie Gavriliuc, Kirkland, WA (US); Robert Thomas Held, Seattle, WA (US); Maxime Ouellet, Kirkland, WA (US); Riccardo Giraldi, Seattle, WA (US); Andrew Frederick Muehlhausen, Seattle, WA (US); Sergio Paolantonio, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/272,904

(22) Filed: Feb. 11, 2019

(65) Prior Publication Data

US 2019/0171463 A1    Jun. 6, 2019

Related U.S. Application Data

(63) Continuation of application No. 15/481,705, filed on Apr. 7, 2017, now Pat. No. 10,249,095.

(51) Int. Cl.
*G06F 9/445* (2018.01)
*G06F 3/01* (2006.01)
(Continued)

(52) U.S. Cl.
CPC .......... *G06F 9/445* (2013.01); *G02B 27/017* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS

| 9,013,505 B1* | 4/2015 | Thornton | G09G 5/36 345/419 |
| 2007/0167225 A1* | 7/2007 | Nguyen | A63F 13/10 463/29 |

(Continued)

*Primary Examiner* — Frank S Chen
(74) *Attorney, Agent, or Firm* — Rainier Patents, P.S.

(57) ABSTRACT

A technique is described herein for presenting notifications associated with applications in a context-based manner. In one implementation, the technique maintains a data store that provides application annotation information that describes a plurality of anchors. For instance, the application annotation information for an illustrative anchor identifies: a location at which the anchor is virtually placed in an interactive world; an application associated with the anchor; and triggering information that describes a set of one or more triggering conditions to be satisfied to enable presentation of a notification pertaining to the application. In use, the technique presents the notification pertaining to the application in prescribed proximity to the anchor when it is determined that the user's engagement with the interactive world satisfies the anchor's set of triggering conditions. The triggering conditions can specify any combination of spatial factors, temporal factors, user co-presence factors, etc.

21 Claims, 10 Drawing Sheets

(51) Int. Cl.
*G02B 27/01* (2006.01)
*G06F 17/24* (2006.01)
*G06F 3/0481* (2013.01)
*G06F 3/0484* (2013.01)
*G06F 3/0482* (2013.01)
*G06T 7/73* (2017.01)
*G06T 19/00* (2011.01)

(52) U.S. Cl.
CPC ............ *G06F 3/013* (2013.01); *G06F 3/0482* (2013.01); *G06F 3/04815* (2013.01); *G06F 3/04842* (2013.01); *G06F 17/241* (2013.01); *G06T 7/73* (2017.01); *G06T 19/006* (2013.01); *G02B 2027/0178* (2013.01)

(56) References Cited

U.S. PATENT DOCUMENTS

| | | | |
|---|---|---|---|
| 2012/0072312 A1* | 3/2012 | Lange | G06Q 30/06 705/27.1 |
| 2013/0339345 A1* | 12/2013 | Soto Matamala | H04W 4/21 707/722 |
| 2014/0368533 A1* | 12/2014 | Salter | G02B 27/017 345/619 |
| 2016/0328402 A1* | 11/2016 | McIntosh | G06F 16/338 |
| 2017/0289762 A1* | 10/2017 | Cudalbu | G01C 21/20 |
| 2018/0253145 A1* | 9/2018 | Swaminathan | G06K 9/00604 |
| 2019/0025583 A1* | 1/2019 | Mullins | G02B 27/0103 |

\* cited by examiner

```
                                                                    ← 1402

┌─────────────────────────────────────────────────────────────────────────┐
│  PROVIDE A DATA STORE OF APPLICATION ANNOTATION INFORMATION THAT IDENTIFIES: │
│   (1) AN ANCHOR; (2) A LOCATION AT WHICH THE ANCHOR IS VIRTUALLY PLACED IN AN │
│     INTERACTIVE WORLD; (3) AN APPLICATION ASSOCIATED WITH THE ANCHOR; AND │
│   (4) TRIGGER INFORMATION THAT DESCRIBES A SET OF ONE OR MORE TRIGGERING │
│     CONDITIONS TO BE SATISFIED TO ENABLE PRESENTATION OF A NOTIFICATION │
│                      PERTAINING TO THE APPLICATION                      │
│                                  1404                                   │
└─────────────────────────────────────────────────────────────────────────┘
                                    │
                                    ▼
┌─────────────────────────────────────────────────────────────────────────┐
│     IDENTIFY A CURRENT CONTEXT IN WHICH A USER IS ENGAGING THE INTERACTIVE │
│     WORLD, WHILE SIMULTANEOUSLY PRESENTING A REPRESENTATION OF THE       │
│              INTERACTIVE WORLD ON A DISPLAY DEVICE                      │
│                                  1406                                   │
└─────────────────────────────────────────────────────────────────────────┘
                                    │
                                    ▼
┌─────────────────────────────────────────────────────────────────────────┐
│   DETERMINE, BASED ON THE CURRENT CONTEXT, WHETHER THE SET OF TRIGGERING │
│        CONDITIONS ASSOCIATED WITH THE ANCHOR HAS BEEN SATISFIED         │
│                                  1408                                   │
└─────────────────────────────────────────────────────────────────────────┘
                                    │
                                    ▼
┌─────────────────────────────────────────────────────────────────────────┐
│     IF THE SET OF TRIGGERING CONDITIONS HAS BEEN SATISFIED, PRESENT THE │
│       NOTIFICATION IN PRESCRIBED PROXIMITY TO THE ANCHOR, WITHIN THE    │
│              REPRESENTATION OF THE INTERACTIVE WORLD                    │
│                                  1410                                   │
└─────────────────────────────────────────────────────────────────────────┘
                                    │
                                    ▼
┌─────────────────────────────────────────────────────────────────────────┐
│    RECEIVE AN INPUT SIGNAL FROM AN INPUT DEVICE THAT INDICATES THAT THE USER │
│                    HAS ACTIVATED THE NOTIFICATION                       │
│                                  1412                                   │
└─────────────────────────────────────────────────────────────────────────┘
                                    │
                                    ▼
┌─────────────────────────────────────────────────────────────────────────┐
│   IN RESPONSE TO THE RECEIVING OF THE INPUT SIGNAL, INVOKE THE APPLICATION, TO │
│                  PROVIDE AN APPLICATION EXPERIENCE                      │
│                                  1414                                   │
└─────────────────────────────────────────────────────────────────────────┘
```

FIG. 14

CONTEXT-BASED DISCOVERY OF APPLICATIONS

BACKGROUND

A user may obtain an application while interacting with a given environment by manually accessing an application marketplace using a local computing device. The user may then manually search for an application that satisfies the user's current needs, and then manually download that application to his or her local computing device. This process is cumbersome and labor-intensive in nature. The process may be particularly ill-suited for use in conjunction with applications that provide various types of modified-reality environments with which the user may interact.

SUMMARY

A technique is described herein for presenting notifications associated with applications in a context-based manner. In one implementation, the technique maintains a data store that provides application annotation information that describes a plurality of anchors. For instance, the application annotation information for an illustrative anchor identifies: a location at which the anchor is virtually placed in an interactive world provided by some form of modified-reality technology; an application associated with the anchor; and triggering information that describes one or more triggering conditions to be satisfied to enable presentation of a notification pertaining to the application.

In use, the technique identifies a current context in which a user is engaging the interactive world. The technique then determines, based on the current context, whether the set of triggering conditions associated with the anchor has been satisfied. If so, the technique presents the notification pertaining to the application in a prescribed proximity to the anchor, within the interactive world. The technique then invokes the application when it is determined that the user has activated the notification, to provide an application experience.

According to another aspect, an illustrative spatial triggering condition specifies that the user is permitted to receive the notification when the user moves to a position within the interactive world that has a prescribed spatial relationship with respect to the anchor.

According to another aspect, an illustrative temporal triggering condition specifies that the user is permitted to receive the notification when the user performs a prescribed action within a specified timeframe.

According to another aspect, an illustrative user co-presence triggering condition specifies that the user is permitted to receive the notification when the user and at least one other person, besides the user, move to a prescribed zone in the interactive world.

For example, the technique may display a virtual cube that hovers in proximity to a door of a building when the user moves within two meters of an anchor "attached" to the door. The virtual cube serves as a notification that an application is available that provides an application experience that may be useful to the user in the user's current contextual situation. For example, the application may provide guidance to the user in traversing the building, upon entering the building. The user may invoke this application experience by selecting the virtual cube. In a variation of this example, the technique will only present the virtual cube when the user approaches the door within certain hours of the day, and/or when the user is accompanied by another person with whom the user may interact via the application, etc.

The technique facilitates the user's access to applications in a modified-reality environment. In addition, the technique minimizes distractions placed on the user as the user navigates through the modified-reality environment, and therefore accommodates a safer user experience compared to a process of manually searching an application marketplace, without context-based assistance.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 14 shows a process that describes one manner of operation of the AAF of FIG. 6.

Figure 1:
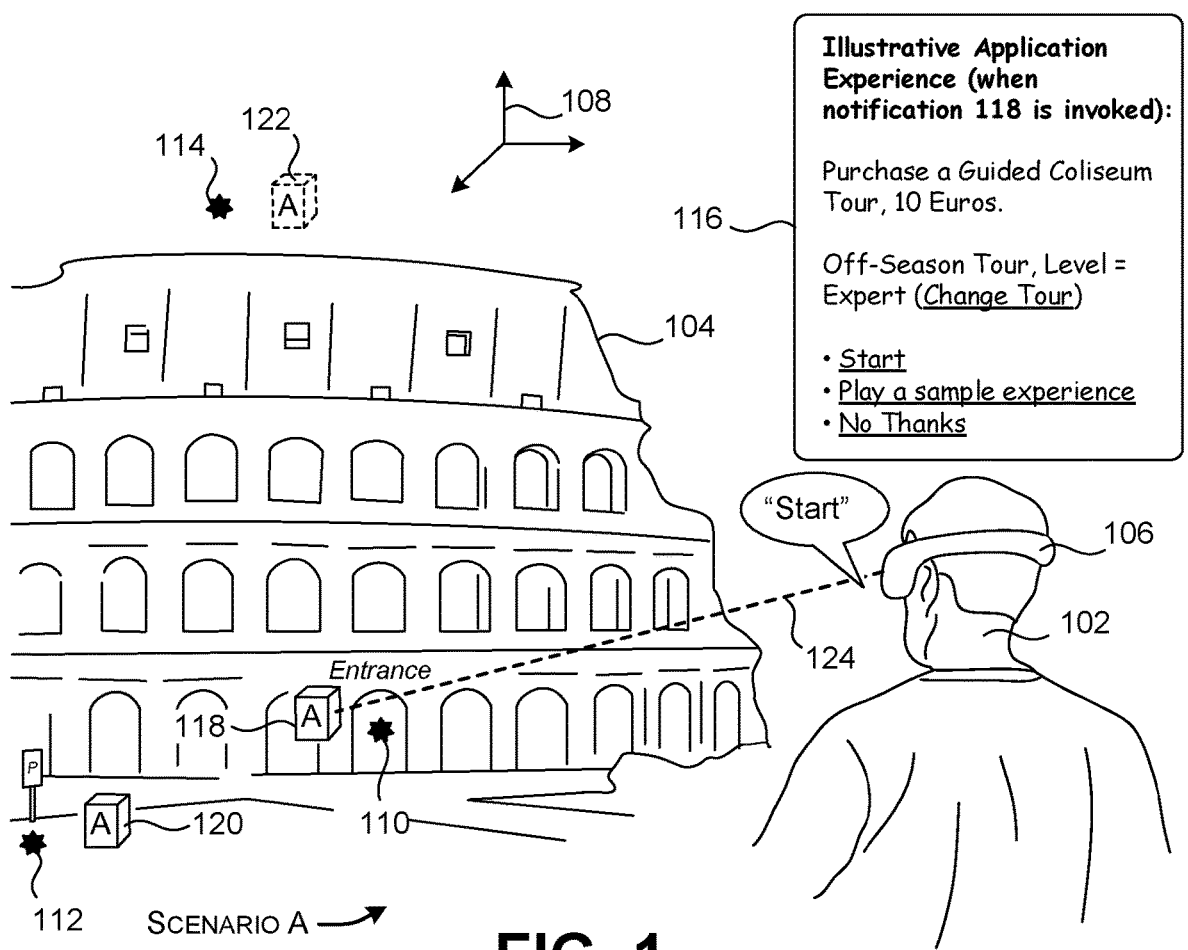
FIGS. 1-5 show five respective scenarios in which notifications are presented to a user within an interactive world, e.g., corresponding to a world provided by some form of modified-reality technology.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes scenarios that involve the use of an application annotation framework (AAF). Section B describes one implementation of the AAF. Section C describes the operation of the AAF of Section B in flowchart form. And Section D describes illustrative computing functionality that can be used to implement any aspect of the features described in the preceding sections.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section D provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Use Scenarios

The following section introduces an application annotation framework (AAF) by describing the user experience that it provides, with reference to five illustrative use scenarios. Section B (to follow) sets forth one illustrative implementation of the AAF.

By way of overview, the AAF provides notifications to a user within an interactive world that alerts the user to the existence of applications. The interactive world contains any combination of real content (associated with real objects in a physical environment) and virtual content (corresponding to machine-generated objects). In the most general sense, modified-reality technology can produce such an interactive world. As used herein, the term "modified-reality" encompasses at least augmented-reality (AR) technology, mixed-reality (MR) technology, virtual-reality (VR) technology, augmented VR technology, etc., or any combination thereof.

AR technology and MR technology provide an interactive world that includes a representation of the physical environment as a base, with any kind of virtual objects added thereto. The virtual objects can include text, icons, video, graphical user interface presentations, static scene elements, animated characters, etc. VR technology provides an interactive world that is entirely composed of virtual content. Augmented VR technology provides an interactive world that includes virtual content as a base, with real-world content added thereto. To nevertheless facilitate and simplify the explanation, most of the examples presented herein correspond to a user experience produced using AR or MR technology. Section D provides additional information regarding representative technology for providing a modified-reality user experience.

As used herein, an application refers to any executable or presentable content that provides any type of experience to a user. In some cases, an application may provide the experience by executing a computer program that performs any function(s). Alternatively, or in addition, an application may provide the experience by playing or presenting any kind of audiovisual content, textual content, graphical content, and so on.

FIG. 1 shows a first scenario (Scenario A) in which an end-user 102 visits a physical environment correspond to the actual Roman Coliseum 104 in Rome, Italy. The user interacts with this physical environment using a head-mounted display (HMD) 106. The HMD 106 provides an interactive world that combines real objects in the physical environment with virtual content of any type (examples of which are described below), with reference to a world coordinate system 108.

More specifically, the interactive world includes the Coliseum 104 (or any other real object) in the sense that it includes some kind of representation of the Coliseum 104. In one implementation, the AAF can represent a real physical object in the interactive world in direct fashion, e.g., by providing a partially-transparent display device through which the user may observe the real physical object in the physical environment. In another implementation, the AAF can represent a real physical object in indirect fashion, e.g., by capturing an image of the real object using a camera, and producing the interactive world by combining the image of the real object with one or more virtual objects. But to simplify the explanation, the following description will sometimes make reference to any real object that appears in an interactive world in terms of its physical manifestation in the physical environment. For example, the description will state that the interactive world contains the Coliseum 104, rather than a representation of the Coliseum; the former terminology ("the Coliseum") should be interpreted as a shorthand reference to the latter terminology ("a representation of the Coliseum").

The AAF operates based on a data store that provides application annotation information. The application annotation information identifies one or more anchors that have been previously placed at locations within the interactive world. For each anchor, the application annotation information may also describe: (a) a location in the interactive world associated with the anchor; (b) at least one application associated with the anchor; and (c) triggering information that describes a set of triggering conditions. For a given anchor, the triggering conditions describe circumstances to be satisfied to enable presentation of a notification pertaining to the application that is associated with the anchor. In other words, an anchor serves as a virtual marker or tag that is placed in the interactive world. That virtual marker or tag serves as a reference point for displaying a notification associated with an application, but only when the triggering condition(s) are met.

In one implementation, an application developer can create application annotation information associated with an application as part of the application development process. Alternatively, or in addition, an end-user (or anyone else) can create application annotation information associated with an application that has already been created. In general, the annotation creation process involves specifying the location of the anchor in the interactive world, specifying an association between the anchor and at least one application, and defining the triggering condition(s) associated with the <anchor, application> pairing. The following explanation refers to the person (or entity) that creates application annotation information as a "creator-user" to distinguish such a user from the end-user 102 who interacts with the interactive world. Following creation, any user can share an instance of application annotation information with any other user, enabling the recipient user to discover a notification associated therewith in an interactive world.

In the specific case of FIG. 1, some creator-user has previously associated a first anchor 110 with the entrance to the Coliseum 104. That creator-user has further associated that anchor 110 with a first application. For instance, assume that the first application provides a guided tour of the interior of the Coliseum 104 to the end-user 102, contingent on the end-user 102 paying a specified fee. Further assume that some creator-user has previously associated a second anchor 112 with a parking lot near the Coliseum 104, and associated that anchor 112 with a second application. For instance, assume that the second application provides a service that allows a user to pay for the use the parking lot. Further assume that some creator-user has previously associated a third anchor 114 with a position above the Coliseum 104, and associated that anchor 114 with a third application. For example, assume that the third application provides an audiovisual presentation pertaining to the history of the Coliseum's construction.

More generally, any number of creator-users can create any number of anchors in any given interactive world. In other cases, a creator-user may associate plural applications with the same anchor. Further, an application can deliver any application experience when it is invoked. In some cases, an application experience can involve the presentation of one or more user interface presentations, such as a user interface presentation 116. Alternatively, or in addition, an application experience can involve providing audiovisual experiences to the user 102, such as by providing a movie, song, document, etc. Alternatively, or in addition, an application experience can involve populating the interactive world with virtual characters or other virtual scene elements. For example, an illustrative application experience can show virtual gladiators within the Coliseum 104. The application may allow the user 102 to interact with those virtual characters.

In a real-time mode of operation, the AAF detects current context information that describes the user's current contextual situation with respect to the interactive world (and with respect to the complementary physical environment). For example, the context information can describe the user's position within the physical environment, a current time and date, and the co-presence of other people in the vicinity of the user 102. The context information may also describe various characteristics regarding the user, such as the user's age, skill level, subject matter interests, and so on.

The AAF then determines a subset of notifications to present to the user 102, if any. In one implementation, the AAF makes this decision by identifying anchors within the field of view of the user 102 (corresponding to a volume within the interactive world), and determining whether the triggering conditions associated with those anchors have been met. The AAF then presents the subset notifications to the user. Each notification is associated with an application.

For example, assume that the first anchor 110 (placed near the entrance of the Coliseum) includes triggering information that indicates that a notification for the first application will be displayed when: (a) the user 102 is within 20 meters of the first anchor 110; and (b) the date is between January $1^{st}$ to May $1^{st}$. Assume that the AAF determines that both of these triggering conditions are met, based on the current date and the user's current location in the physical environment. In response, the AAF will display a notification 118 in prescribed proximity to the first anchor 110, e.g., at the same position as the first anchor 110 or adjacent to the first anchor 110. In this merely illustrative case, the notification 118 corresponds to a cubical icon.

Note that FIG. 1 shows that the representation of the interactive world as presented to the user 102 contains a visual representation of the anchor 110 itself. But other implementations may display the notification 118 without providing any information that reveals the location of the associated anchor 110.

Similarly, assume that the AAF displays a second notification 120 associated with the second anchor 112, and a third notification 122 associated with the third anchor 114. Any notification can have one or more visual attributes that reveals its properties. For example, a notification can have attributes that describe: (1) whether the application corresponding to the notification is currently provided in a local data store or whether it is accessible from a remote data store (and has yet to be downloaded); (2) the application's popularity rating; (3) the application's subject matter; (4) the application's user-maturity rating and/or skill level; (5)

whether the application is free to use or requires payment of a fee, and so on. In the example of FIG. 1, the first and second notifications (118, 120) correspond to solid cubes, while the third notification 122 corresponds to a semi-transparent cube. In this merely illustrative case, a solid cube indicates that a corresponding application has already been installed in a local data store of the HMD 106, while a semi-transparent cube indicates that the corresponding application has not yet been installed in the local data store, but it is nevertheless available from a remote data store.

Assume that a user 102 invokes the first application associated with the first notification 118. The user 102 can perform this operation in different ways. In one approach, the user may train his gaze to the first notification 118 and then perform a telltale gesture (such as an air tap) or issue a voice command, etc. FIG. 1 denotes the projection of the user's gaze as a dashed line 124. In another implementation, the user 102 can select the first notification 118 by pointing to it with an outstretched hand, or by manipulating a separate controller, etc. In general, the AAF can use known gaze detection techniques and gesture recognition techniques to detect the user's selection. In response to the user's actions, the AAF will then invoke the first application.

Figure 2:
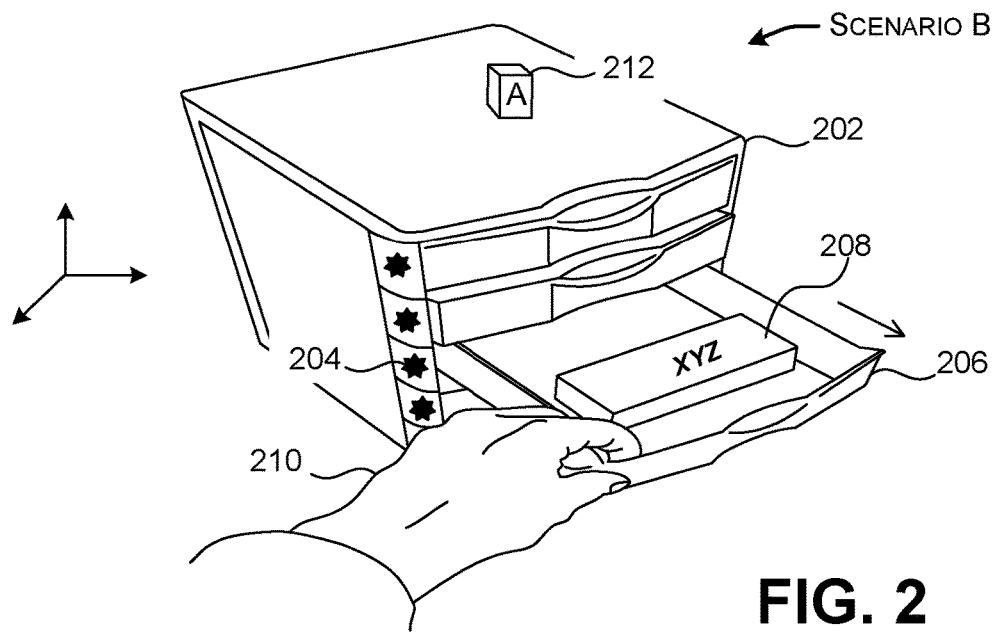

FIG. 2 shows a second use scenario (Scenario B) in which a creator-user has associated anchors with different respective bins of a physical cabinet 202. For example, the user has associated an anchor 204 with a particular bin 206 of the cabinet 202. Assume that the particular bin 206 includes a physical implement, generically referred to an XYZ implement 208. For instance, the XYZ implement 208 may correspond to some kind of article that is used in the course of playing a game, such as a cribbage board. Further assume that the creator-user has associated an application with the anchor 204 that allows a user to interact with the XYZ implement to perform some task, such as playing the game of cribbage against a virtual opponent. Finally, the creator-user also associates a triggering condition with the anchor 204 that specifies that a notification for the application will be presented when an end-user opens the bin 206 containing the XYZ implement 208.

The AAF subsequently detects that the user has opened the bin 206 with his or her hand 210. The AAF can make this determination in different ways. For example, the AAF can receive sensor signals from sensors associated with the bins of the cabinet 202, which reveal when any bin has been opened. Alternatively, or in addition, the AAF can use one or more cameras (e.g., video cameras, a depth camera system, etc.) to provide image information that captures the cabinet 202 and the user's interaction with the cabinet 202. The AAF can then use pattern-matching technology (such as a machine-learned classification model) to analyze the image information, with the goal of determining when any bin has been opened.

In response to a determination that the bin 206 has been opened, the AAF provides a notification 212 in the interactive world. Assume that the user invokes the notification 212. In response, the AAF can invoke an application that allows a user to perform some task using the XYZ implement 208. For instance, the AAF can present the introductory user interface presentation (not shown) in the interactive world.

More generally, FIG. 2 serves as just one example of a case in which the user triggers the presentation of a notification in response to some action that the user performs with respect to an object within the interactive world. Here, the object corresponds to the bin 206, and the action corresponds to opening the bin 206. But other triggering actions may include: opening a door; pressing a real or virtual button; climbing to a particular floor of a building, and so on. The triggering information can also combine an action-related triggering condition with any type of triggering condition described above with respect to FIG. 1, such as a spatial triggering condition and/or a temporal triggering condition, and/or some other triggering condition.

Figure 3:
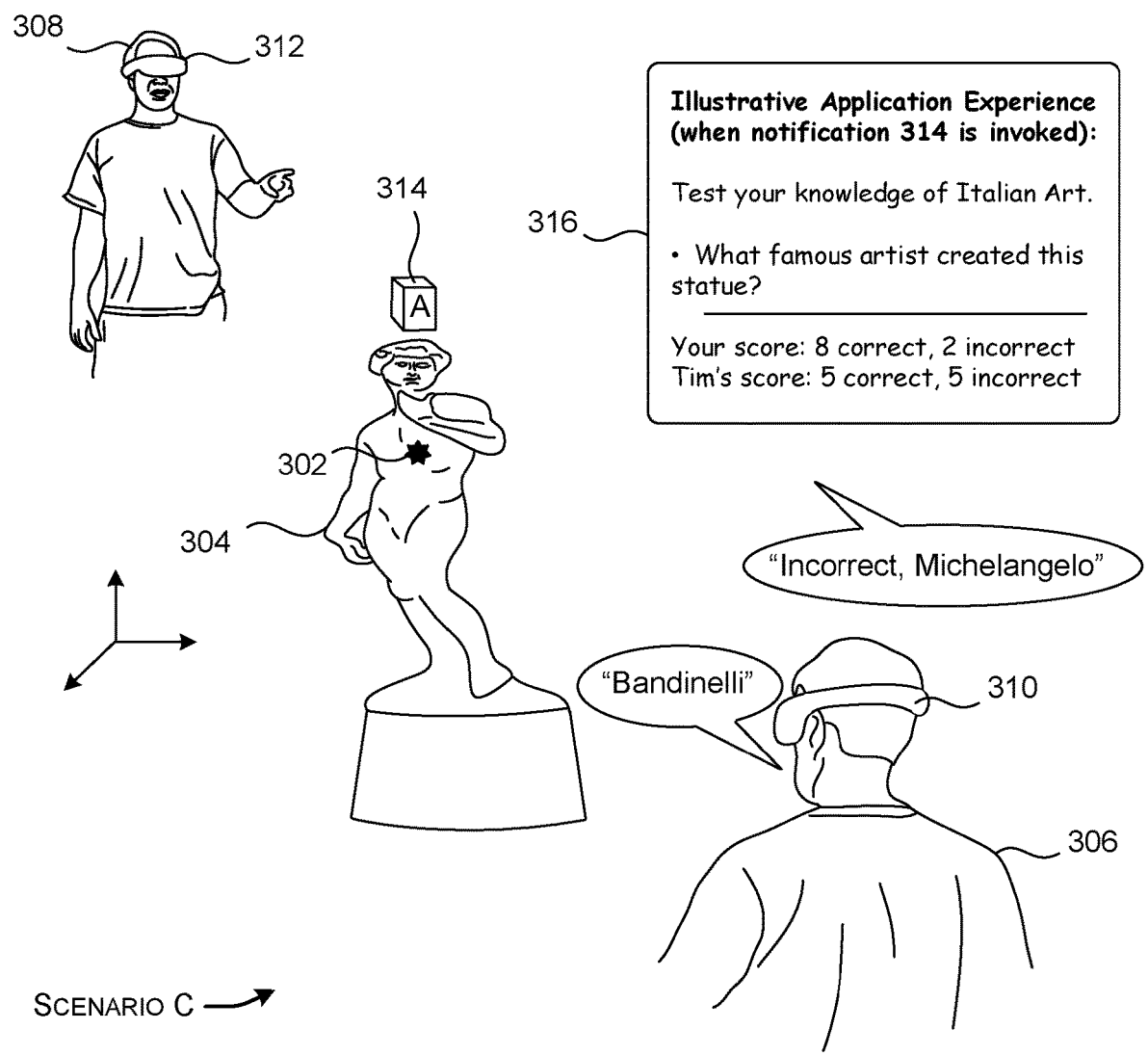

FIG. 3 shows a third scenario (Scenario C) in which a creator-user has associated an anchor 302 with the statue 304 of David in the Galleria dell'Accademia, in Florence, Italy. The creator-user has further associated the anchor 302 with an application that provides a game experience in which a user 306 competes with at least one other person (e.g., person 308) in the Galleria. The user 306 and the other person 308 interact with the application via respective HMDs (310, 312). For example, in one merely illustrative case, assume that the application poses questions to the user 306 and the other person 308 regarding exhibits that are encountered in the Galleria. The user 306 and the other person 308 compete to determine who can answer the most questions correctly.

The creator-user associates two triggering conditions with the anchor 302. A first triggering condition specifies that the AAF will present a notification 314 for the application only when the user 306 moves to within a prescribed distance of the anchor 302, such as five meters. A second (user co-presence) triggering condition specifies that the AAF will present the notification 314 only when at least one other person is also within a prescribed distance of the anchor 302. This second triggering condition ensures that there will be at least one other person (e.g., person 308) with whom the user 306 may play the game.

Other implementations can vary the user co-presence triggering condition in different ways. For example, in another scenario, a creator-user can create a trigging condition that requires a particular number n of people within a prescribed zone in the interactive world, besides the user 306. In another scenario, a creator-user can create a triggering condition that requires the presence of a particular person or persons, or the presence of particular person (or persons) selected from a specified class of users. For example, the class may specify people who are friends or coworkers of the user 306, or people who have the same skill level as the user 306, or people who have the same subject matter interests as the user 306, and so on.

In the real-time mode of operation, the AAF determines when the user 306 and the other person 308 move within a prescribed distance of the anchor 302. The AAF then presents the notification 314 in a prescribed location relative to the anchor 302, e.g., above the head of the statue 304. The user 306 will see the notification 314 from his particular vantage point relative to the statue 304, while the other person 308 will see the notification 314 from his particular vantage point relative to the statue 304. In one implementation, each person otherwise observes the same version of the interactive world. But in another implementation, the AAF can give each person a customized view of the interactive world.

Assume that both the user 306 and the other person 308 separately invoke the notification 314, e.g., in the same manner described above with respect to FIG. 1. In response, the application provides the game experience to both users. For instance, at the current time, the application presents the user interface presentation 316 to the user 306. That user interface presentation 316 asks the user 306 a question. The user 306 verbally provides an answer to the question. The application informs the user that he is incorrect, e.g., via a spoken response. The user interface presentation 316 can also provide a tally of the number of questions that each participant has answered correctly and incorrectly.

Figure 4:
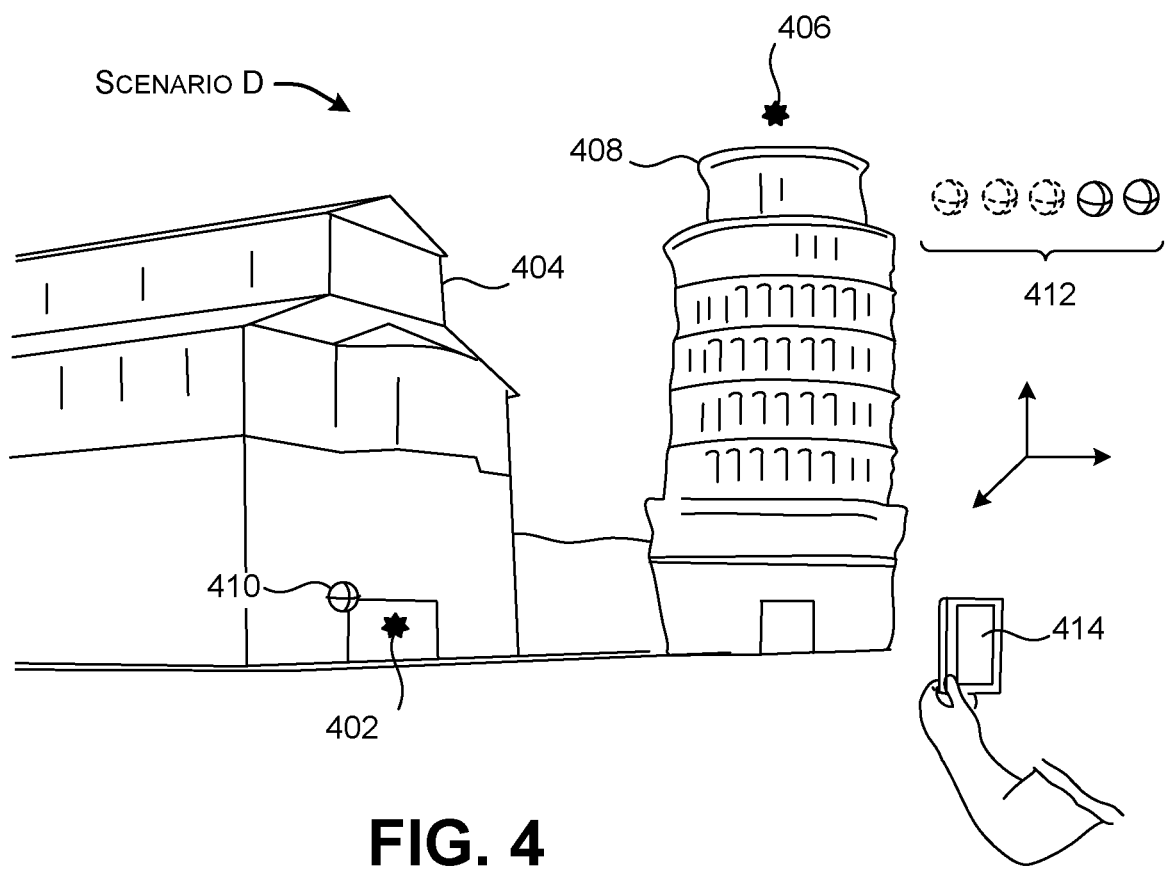

FIG. 4 shows a fourth user scenario (Scenario D) in which a creator-user has placed a first anchor 402 on the entranceway of the Pisa Cathedral 404, and a second anchor 406 above the Tower of Pisa 408. When a user satisfies the triggering condition(s) associated with the first anchor 402, the AAF will present a first notification 410, correspond to a first application. When a user satisfies the triggering condition(s) associated with the second anchor 406, the AAF will present a set of notifications 412 associated with a respective set of applications.

FIG. 4 primarily differs from the previous scenarios in that the user interacts with the interactive world via a handheld computing device 414, rather than, or in addition to, an HID. For example, without limitation, the handheld computing device 414 may correspond to a smartphone, a tablet-type computing device, a laptop computing device, a wearable computing device (other than an HMD), and so on, or any combination thereof. In any case, the handheld computing device 414 includes one more cameras for capturing an image of a physical scene, and a display device. In the example of FIG. 4, the camera(s) and the display device are located on opposing sides of the handheld computing device 414. The display device may incorporate a touch-sensitive screen.

In use, FIG. 4 shows that the user points the camera(s) of the handheld computing device 414 in the direction of the Pisa Cathedral 404 and the Tower of Pisa 408. The cameras produce a representation of these physical objects. The AAF combines this representation of the physical scene with the virtual content, e.g., corresponding to the notifications (410, 412). The display device presents the resultant modified-reality world to the user. The user may interact with a notification in any manner, e.g., by touching the display device's touch-sensitive screen at the location on the screen at which the notification is displayed. The handheld computing device 414 then invokes whatever application is associated with the activated notification.

Figure 5:
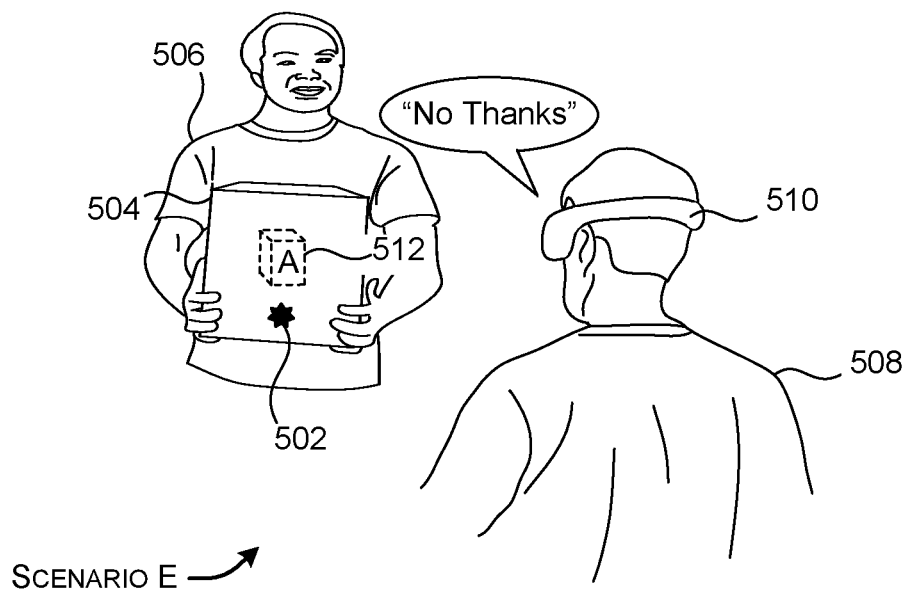

FIG. 5 shows a fifth user scenario (Scenario E) in which a creator-user has associated an anchor 502 with an object that moves within the interactive world. Here, the movable object corresponds to physical object within a physical environment, e.g., corresponding to a physical box 504. In the current state, an actual person 506 is carrying the box 504 in the physical environment. But in other cases (not shown), the movable object corresponds to a virtual object, such as a virtual character that is capable of moving within the interactive world.

The creator-user associates the anchor 502 with the movable object by providing application annotation information which provides a suitable description of the movable object. For example, the creator-user can store a representation of the visual appearance of the movable object, e.g., by providing image content that depicts the movable object (e.g., the box 504) in at least one state. In the case in which the movable object is a virtual object, the creator-user can store an identifier that is associated with that virtual object.

The creator-user can also associate any triggering condition(s) with the anchor 502. For example, the creator-user can indicate that the AAF will display a notification associated with the anchor 502 when any observing user is within a prescribed distance to the anchor 502.

In use, assume that an observing user 508 receives a representation of the above-described interactive world via an HMD 510. The AAF will display a notification 512 when the user 508 draws within the prescribed distance to the anchor 502. To perform this task, the AAF can use known object-tracking technology to track the movement of the box 504 through the interactive world. Alternatively, if the anchor 502 is attached to a virtual object, the AAF has knowledge of the location of the virtual object as a given. The user 508 may then invoke the notification 512 in the same manner described above with reference to FIG. 1. This action activates the application associated with the notification 512.

In one use case, the person 506 may offer the application associated with the notification 512 as a gift to the user 508. For example, the person 506 may provide a game application to his friend, corresponding to the user 508. To perform this task, the person 506 operates as a creator-user who associates the anchor 502 with both the application and the box 504. The person 506 may then physically carry the box 504 to the user 508, much in the same way that the person 506 would carry a wrapped gift to a friend.

In a variation of the above behavior, the person 506 can associate an additional triggering condition with the anchor 502 that prevents the notification 512 from being displayed until the user 508 performs some action associated with opening the box 504, such as opening a lid of the box 504, or removing wrapping paper from the box 504. The AAF can detect such a telltale action using pattern recognition technology.

The above five use scenarios are described by way of example, not limitation. Other use scenarios can make the presentation of notifications contingent on yet additional context factor(s).

According to one aspect of the technology described above, the AAF can selectively populate the interactive world with notifications that may be particularly useful to the user, given the user's current contextual situation within the interactive world. At the same time, the AAF can suppress the presentation of notifications that are not pertinent to the user's current contextual situation. This facilitates the user's discovery and selection of relevant application experiences, e.g., by forgoing or reducing the need for the user to manually hunt for and select a relevant application. The AAF also reduces the distraction placed on the user at any given time, e.g., by not overwhelming the user with too many notifications, and by particularly suppressing notifications that are unlikely to be interesting to the user, given the user's contextual situation. This produces an experience that is enjoyable to the user and safer (compared to the case in which the user is required to manually search through a potentially large marketplace of applications). For instance, the AAF can reduce the clutter in an interactive world, which, in turn, places fewer demands on the attention of the user as the user moves through a counterpart physical environment.

B. Illustrative Application Annotation Framework

Figure 6:
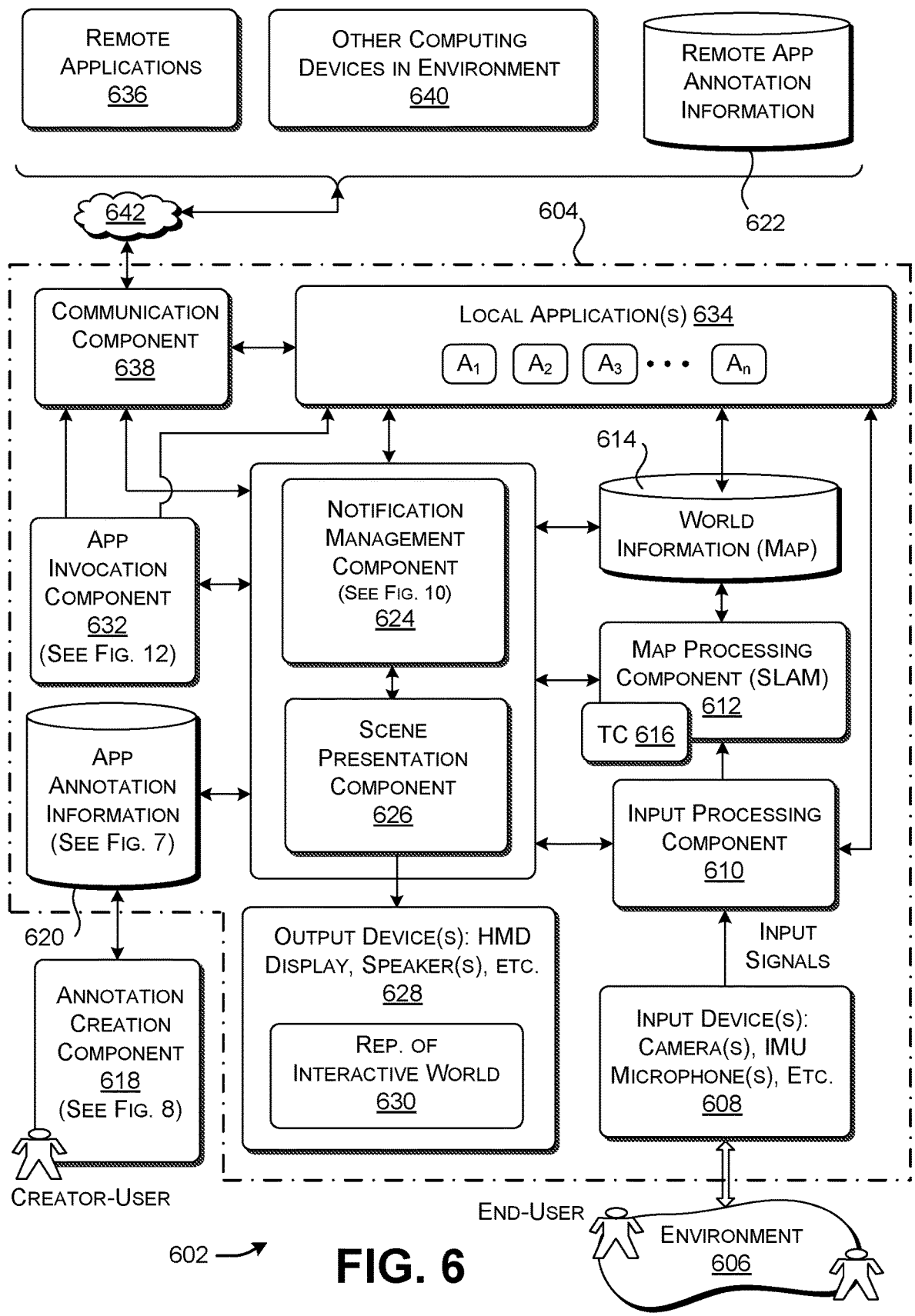
FIG. 6 shows an application annotation framework (AAF) for implementing the scenarios shown in FIGS. 1-5.
Figure 15:
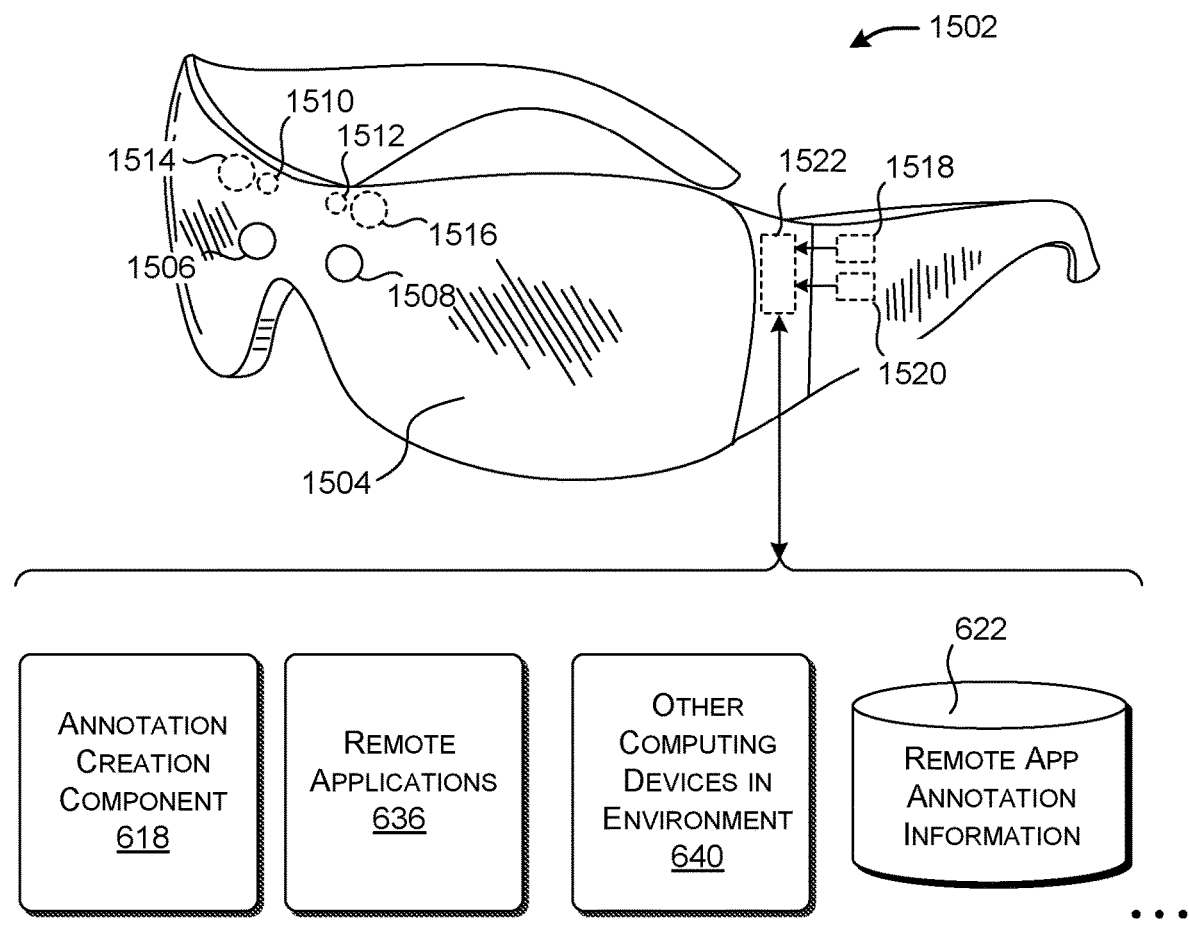
FIG. 15 shows a head-mounted display (HMD), which can be used to implement at least parts of the AAF of FIG. 6.

FIG. 6 shows an application annotation framework (AAF) 602 for implementing the scenarios shown in FIGS. 1-5. The AAF 602 can be implemented by one or more computing devices. For example, the AAF 602 can include a head-mounted display (HMD) 604, generally corresponding to a group of components shown in FIG. 6 enclosed by a dashed-line box. FIG. 15 (described in Section D) provides additional details regarding one illustrative implementation of the HMD 604. In other implementations, the AAF 602 can use a handheld computing device or some other kind of computing device (instead of an HMD, or in addition to an HMD).

One or more other computing devices can implement other components shown in FIG. 6, outside the dashed-line box associated with the HMD 604. These other computing device(s) are communicatively coupled to the HMD 604. Note, however, that the allocation of components to different computing devices shown in FIG. 6 represents one implementation among many; other implementations can adopt other allocations of components to one or more computing devices.

The HMD 604 includes a collection of input devices 608 for interacting with a physical environment 606. The input devices 608 can include, but are not limited to: one or more environment-facing video cameras, an environment-facing depth camera system, a gaze-tracking system, one or more microphones, an inertial measurement unit (IMU), etc.

Each video camera can correspond to a red-green-blue (RGB) camera for producing video information. The depth camera system can identify the depth of features in the environment using any kind of technology, such as a structured light technique, a stereoscopic technique, a time-of-flight technique, and so on.

The IMU can determine the movement of the HMD 604 in six degrees of freedom. The IMU can include one or more accelerometers, one or more gyroscopes, one or more magnetometers, etc. In addition, the input devices 608 can incorporate other position-determining technology for determining the position of the HMD 604, such as a global positioning system (GPS) system, a beacon-sensing system, a wireless triangulation system, a dead-reckoning system, a near-field-communication (NFC) system, etc., or any combination thereof.

The gaze-tracking system can determine the position of the user's eyes and/or head. The gaze tracking system can determine the position of the user's eyes, in turn, by projecting light onto the user's eyes, and measuring the resultant light that is reflected from the user's eyes. Background information regarding one system for tracking the position of the user's eyes is provided in U.S. Patent Application No. 20140375789 to Lou, et al., published on Dec. 25, 2014, and entitled "Eye-Tracking System for Head-Mounted Display." The gaze-tracking system can determine the position and orientation of the user's head based on IMU information provided by the IMU.

Figure 13:
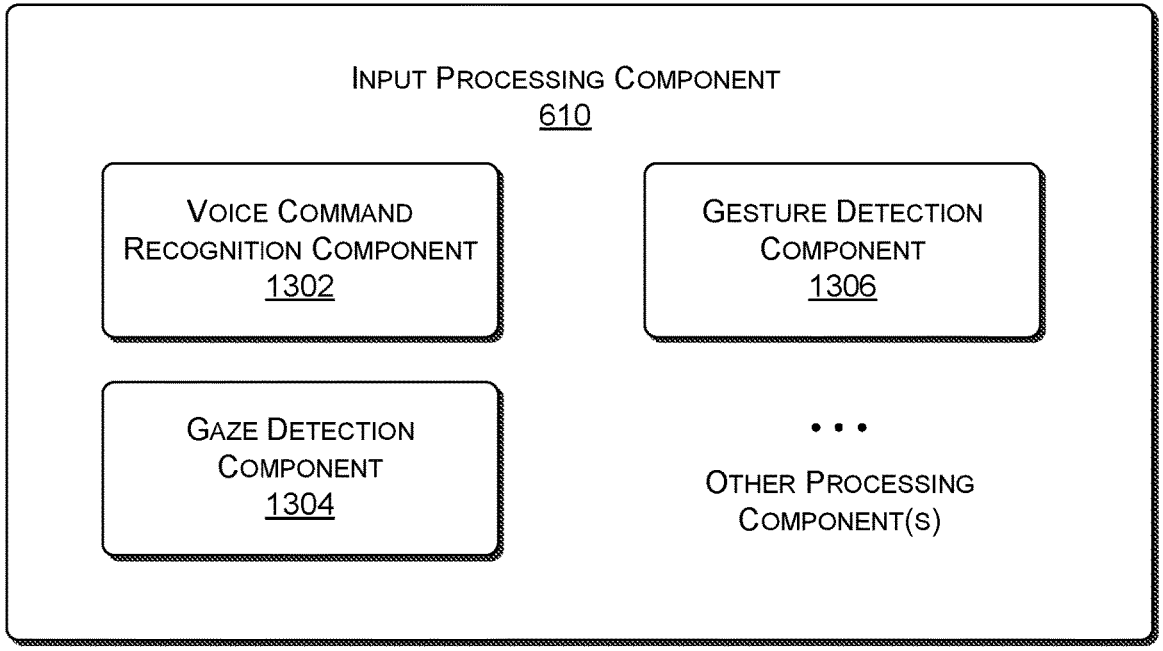
FIG. 13 shows one implementation of an input processing component, which is another element of the AAF of FIG. 6.

An input processing component 610 performs any type of processing on the raw input signals fed to it by the input devices 608. For example, the input processing component 610 can identify an object that the user is presumed to be looking at in the interactive world by interpreting input signals supplied by the gaze-tracking system. The input processing component 610 can also identify any gesture performed by the user by interpreting inputs signals supplied by the video camera(s) and/or depth camera system, etc. The input processing component 610 can also identify any voice command issued by the user by analyzing audio input signals supplied by the microphone(s), and so on. FIG. 13 provides additional information regarding one implementation of the input processing component 610.

In some implementations, an optional map processing component 612 may create a map of the physical environment 606, and then leverage the map to determine the location of the HMD 604 in the physical environment 606. A data store 614 stores the map, which also constitutes world information that describes at least part of the interactive world. The map processing component 612 can performs the above-stated tasks using Simultaneous Localization and Mapping (SLAM) technology. The SLAM technology leverages image information provided by the video cameras and/or the depth sensing system, together with IMU information provided by the IMU.

As to the localization task performed by the SLAM technology, the map processing component 612 can attempt to localize the HMD 604 in the environment 606 by searching a current instance of the captured image information to determine whether it contains any image features specified in the map, with respect to a current state of the map. The image features may correspond, for instance, to edge detection points or other salient aspects of the captured image information, etc. The search operation yields a set of matching image features. The map processing component 612 can then identify the current position and orientation of the HMD 604 based on the matching image features, e.g., by performing a triangulation process. The map processing component 612 can repeat the above-described image-based location operation at a first rate.

Between individual instances of the above-described image-based location operation, the map processing component 612 can also compute the current position and orientation of the HMD 604 based on current IMU information supplied by the IMU. This IMU-based location operation is less data-intensive compared to the image-based location operation, but potentially less accurate than the image-based location operation. Hence, the map processing component 612 can perform the IMU-based location operation at a second rate that is greater than the first rate (at which the image-based location operation is performed). The image-based location operation serves to correct errors that have accumulated in the IMU-based location operation.

As to the map-building task of the SLAM technology, the map processing component 612 identifies image features in the current instance of captured image information that have no matching counterparts in the existing map. The map processing component 612 can then add these new image features to the current version of the map, to produce an updated map. Over time, the map processing component 612 progressively discovers additional aspects of the environment 606, and thus progressively produces a more detailed map.

In one implementation, the map processing component 612 can use an Extended Kalman Filter (EFK) to perform the above-described SLAM operations. An EFK maintains map information in the form of a state vector and a correlation matrix. In another implementation, the map processing component 612 can use a Rao-Blackwellised filter to perform the SLAM operations. Background information regarding the general topic of SLAM can be found in various sources, such as: Durrant-Whyte, et al., "Simultaneous Localisation and Mapping (SLAM): Part I The Essential Algorithms," in *IEEE Robotics & Automation Magazine*, Vol. 13, No. 2, July 2006, pp. 99-110; and Bailey, et al., "Simultaneous Localization and Mapping (SLAM): Part II," in *IEEE Robotics & Automation Magazine*, Vol. 13, No. 3, September 2006, pp. 108-117.

Alternatively, the AAF 602 can receive a predetermined map of the physical environment 606, without the need to perform the above-described SLAM map-building task. Still alternatively, the AAF 602 may receive a description of an entirely virtual world.

A tracking component (TC) 616 tracks selected objects in the interactive world over time, such as by tracking the location of the box 504 in FIG. 5. The tracking component 616 can perform this task by using the map processing component 612 to tracking the movement of a cluster of image features associated with each object to be tracked.

An annotation creation component 618 can produce application annotation information. In one implementation, the HMD 604 implements all or part of the annotation creation component 618. In another implementation, a separate computing device (with which the HMD 604 is communicatively coupled) implements the annotation creation component 618. In either case, a local data store 620 may store the application annotation information produced by the annotation creation component 618

As will be described in further detail below with reference to FIG. 8, the annotation creation component 618 includes functionality that allows a creator-user to specify the position of each anchor in the interactive world. The annotation creation component 618 then allows the creator-user to specify the application(s) and the triggering condition(s) associated with the anchor.

As mentioned in Section A, a creator-user may correspond to a developer who specifies application annotation information as part of the process of developing an application. In another case, a creator-user may correspond to the end-user who uses the HMD 604 to interact with the environment 606.

Alternatively, or in addition, the HMD 604 may interact with one or more remote sources of application annotation information. For example, a remote computer server (with respect to the local HMD 604) can provide a remote data store 622 that provides additional application annotation information.

Any creator-user may produce the application annotation information that is stored in the remote data store 622. In one use scenario, for instance, another person (besides the local user who interacts with the local HMD 604) creates application annotation information, and stores that application annotation information in the remote data store 622. That other person may create permission information that enables the local user to access it. The local HMD 604 can thereafter populate an interactive world with notifications based on application annotation information provided in the local data store 620 and/or the remote data store 622.

A notification management component 624 performs a group of tasks associated with identifying notifications to be presented, and then generating those notifications. For example, as will be more fully described with reference to FIG. 10, the notification management component 624 can identify the current context of the user. The notification management component 624 can then identify a subset of notifications to present to the user at a current time based on: (a) the current context; and (b) the triggering information specified in the data stores (620, 622).

A scene presentation component 626 can use known graphics pipeline technology to produce a three-dimensional (or two-dimensional) representation of the interactive world. The scene presentation component 626 generates the representation based on virtual content provided by an invoked application, the world information in the data store 614, and the application annotation information specified in the data stores (620, 622). The graphics pipeline technology can include vertex processing, texture processing, object clipping processing, lighting processing, rasterization, etc. Background information regarding the general topic of graphics processing is described, for instance, in Hughes, et al., *Computer Graphics: Principles and Practices*, Third Edition, Adison-Wesley publishers, 2014. When used in conjunction with an HMD, the scene processing component 626 can also produce images for presentation to the left and rights eyes of the user, to produce the illusion of depth based on the principle of stereopsis.

One or more output devices 628 provide a representation of the interactive world 630. The output devices 628 can include any combination of display devices, including a liquid crystal display panel, an organic light emitting diode panel (OLED), a digital light projector, etc. In an augmented-reality or mixed-reality experience, the display device can correspond to a semi-transparent display mechanism. That mechanism provides a display surface on which virtual objects may be presented, while simultaneously allowing the user to view the physical environment 606 "behind" the display device. The user perceives the virtual objects as being overlaid on the physical environment 606. In a full virtual-reality experience, the display device can correspond to an opaque (non-see-through) display mechanism.

The output devices 628 may also include one or more speakers. The speakers can provide known techniques (e.g., using a head-related transfer function (HRTF)) to provide directional sound information, which the user perceives as originating from a particular location within the physical environment 606.

An application invocation component 632 responds to a user's activation of one of the notifications presented in the representation of the interactive world 630. In some cases, the application invocation component 632 invokes a local application provided in a collection of local applications 634. In other cases, the application invocation component 632 downloads a remote application stored in a collection of remote applications 636, e.g., when the selected application is not available in the collection of local applications 634. In other cases, the application invocation component 632 invokes and runs a remote application without downloading it, e.g., by streaming audiovisual information to the local HMD 604. One or more computer servers may provide the collection of remote applications 636. For example, the computer servers may implement an online application marketplace.

A communication component 638 allows the HMD 604 to interact with various remote components, such as the remote data store 622 that provides application annotation information, the remote applications 636, and/or other computing devices 640. The other computing devices 640 may correspond to other HMDs operating within the physical environment 606 or some other environment(s). The communication component 638 can interact with the above-identified components using a communication conduit 642, e.g., corresponding to a local area network, a wide area network (e.g., the Internet), a direct peer-to-peer connection of any type, etc. The communication component 638 itself may correspond to a network card or other suitable communication mechanism.

Figures 7, 8:
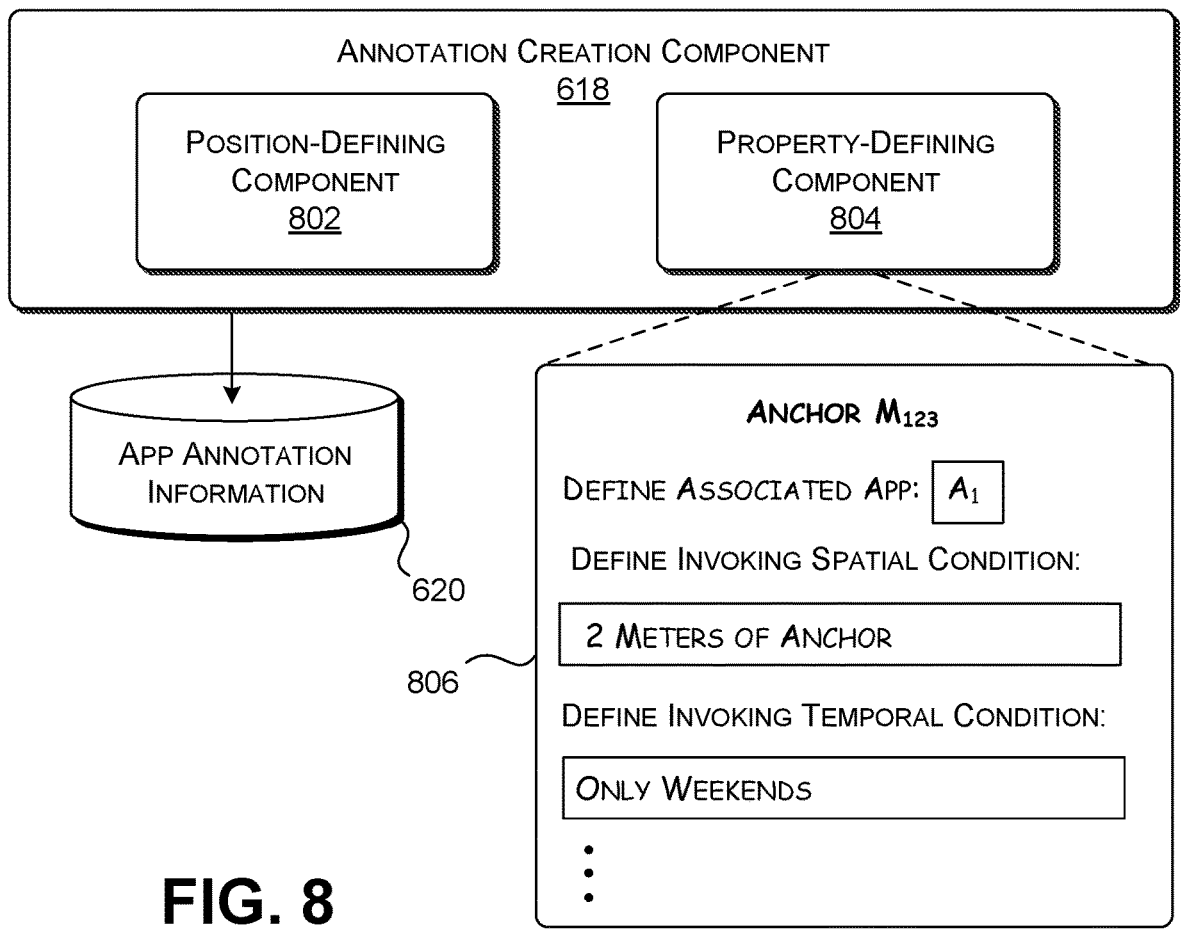
FIG. 7 shows a sample of application annotation information maintained in a data store provided by the AAF of FIG. 6.
FIG. 8 shows one implementation of an annotation creation component, which is an element of the AAF of FIG. 6.

FIG. 7 shows application annotation information maintained in a data store provided by the annotation framework of FIG. 6, such as the local data store 620 or the remote data store 622. With respect to an illustrative anchor, the application annotation information can include: an identifier associated with the anchor; a position of the anchor in the interactive world (or some other way of identifying the location of the anchor); an identifier of the application(s) associated with the anchor; triggering information associated with the anchor; permission information associated with the anchor; notification appearance information (not shown) that describes the appearance and/or behavior of the displayed notification, and so on. In many cases there is a one-to-one association between a single anchor and a single application. But a single application may also be associated with plural anchors placed at different locations. Further, a single anchor can be associated with plural applications.

The triggering information describes a set of one or more triggering conditions associated with the anchor. The triggering conditions can, in turn, leverage any triggering dimension(s) described above, including a spatial dimension, a temporal dimension, a user co-presence dimension (which refers to the presence of other people), a user demographic dimension, a user action-related dimension, etc.

With respect to the spatial dimension, a spatial triggering condition can define a zone in the interactive world for which a notification will be enabled. The zone itself can have any shape, and can be composed of a single continuous area or two or more discontinuous areas. In one example, a spatial triggering condition may specify the zone relative to the anchor, e.g., by specifying that a notification will be enabled when the user is within a prescribed distance from the specified position of an anchor. In another example, a spatial triggering condition may specify that a notification will be enabled when the volume of the interactive world to which the user currently has access includes the anchor. In other words, this kind of spatial triggering condition will specify that a notification will be enabled when the user's current view of the interactive world includes the position associated with the anchor.

Alternatively, or in addition, a spatial triggering condition can define a zone in the interactive world by providing any type of absolute and/or relative position information that defines the perimeter of the zone (with or without making reference to the location of the anchor). A spatial triggering condition can also specify the technology by which position information is to be established, including any of: a GPS system, the map processing component 612, a beacon-detecting system, a wireless triangulation system, a dead-reckoning system, etc.

In other cases, a spatial triggering condition can specify the nature of a movable object to which an anchor is "attached." The spatial triggering condition can describe the object by providing one or more representative images of the object (e.g., in the case in which the movable object corresponds to a real object, such as the box 504 of FIG. 5), and/or by specifying its identifying information (e.g., in the case in which the movable object corresponds to a virtual object).

With respect to the temporal dimension, a temporal triggering condition can define one or more spans of time by specifying the starting time (and/or date) and ending time (and/or date) of each span. A temporal triggering condition can also indicate whether the specified time information refers to a singular occasion or a repeated occurrence, such as a particular weekend or every weekend. A temporal triggering condition can also define a span of time in a relative fashion, e.g., by indicating that a notification will be enabled for one hour following a prescribed event.

With respect to the user co-presence dimension, a co-presence triggering condition can specify that a notification will be enabled when one or more people (besides the user to whom the experience is being delivered) are in a prescribed zone within the interactive world. The co-presence triggering condition can specify those people with any degree of granularity, e.g., by specifying specific friends or coworkers of the user (e.g., by specifying their user IDs), or by more generally specifying a class of people (e.g., by specifying a demographic characteristic of those people).

With respect to the user action-related dimension, an action-related triggering condition can specify an action (such as opening a bin in FIG. 2) by including information that defines that action. For example, the action-related triggering condition can provide a machine-learned binary classifier that is capable of detecting the specified action when applied to image information that captures the action. Alternatively, or in addition, the action-related triggering condition can identify the action by specifying one or more environmental sensor signal(s) that provide evidence of the completion/non-completion of the action.

Still other dimensions can be leveraged to control the presentation of notifications. For example, a capability-related triggering condition makes the presentation of a notification dependent on the ability of a user to consume an application. For example, a capability-related triggering condition can specify that a notification will be presented to a user only when: (1) that user is within a prescribed distance from an anchor, and; (2) that user is carrying or otherwise has access to a particular type of computing device on which the associated application can be run. A capability-related triggering condition can also be combined with a co-presence triggering factor by specifying that a notification will be displayed only when: (1) another person is present in a prescribed zone along with the user; and (2) that other person is capable of participating with the application experience along with the user.

The permission information describes a set of users (or other entities) that are permitted to interact with an anchor and the notifications associated therewith. For example, an individual user may create an instance of application annotation information that includes permission information for an <anchor, application> pairing that identifies the friends who are permitted to interact with the application. In another case, an application publisher may produce application annotation information that includes permission information that defines a class of the people who are permitted to interact with the application, such as by specifying that the application's notification can be viewed by all users over a certain age. The permission information may also be considered as a part of the triggering information, insofar as it describes another condition to be met to enable presentation of a notification associated with the anchor.

The notification appearance information (not shown in FIG. 7) defines the appearance and/or behavior of the notification associated with the application, once the triggering condition(s) are determined to have been met. The appearance can define the visual properties of the notification, the location of the notification relative to the anchor, the behavior of the notification when a user interacts with it, and so on.

FIG. 8 shows one implementation of an annotation creation component 618 that allows a creator-user to create application annotation information. As described above, the HMD 604 may implement at least a part of the annotation creation component 618. Alternatively, or in addition, another computing device (besides the HMD 604) may implement at least part of the annotation creation component 618.

The annotation creation component 618 includes a position-defining component 802 that allows a creator-user to specify the position of an anchor within an interactive world. The position-defining component 802 can perform this task in different ways. In one approach, the position-defining component 802 allows the creator-user to manually specify a location in the interactive world, e.g., by specifying the x, y, and z coordinates of that location.

Figure 9:
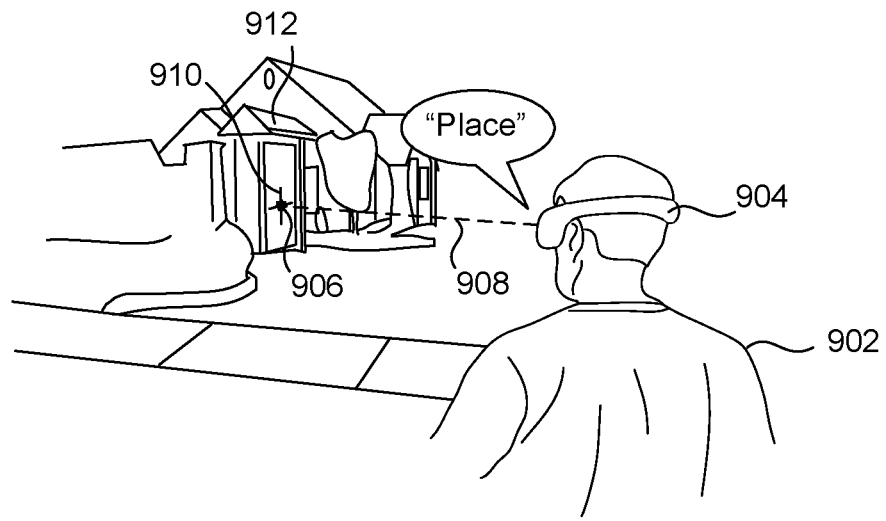
FIG. 9 shows an example of one way to establish the location of an anchor, using the annotation creation component of FIG. 8.

In another case, the position-defining component 802 can work in combination with the HMD 604 to select the position. For example, advancing momentarily to FIG. 9, assume that a creator-user 902 interacts with an interactive world using an HMD 904. The creator-user 902 can select a position at which to place an anchor 906 by casting his gaze on that position. The creator-user 902 performs this task by moving his eyes (and/or his head) such that the creator-user 902 is directly looking at the position. The input processing component 610 (of FIG. 6) can detect the creator-user's gaze, and then identify the position in the interactive world to which the creator-user's gaze is directed. The input processing component 610 can perform this task by casting a ray 908 from the creator-user's eyes into the interactive world, in the direction of the creator-user's gaze. The input processing component 610 can also provide visual feedback to the creator-user 902, which informs the creator user 902 where the ray 908 is being cast into the interactive world. For example, the input processing component 610 can provide a cursor 910 at a location at which the ray 908 cast by the creator-user's gaze intersects with an object in the interactive world. In the example of FIG. 9, the ray 908 intersects a representation of an entrance station 912.

The creator-user 902 may then select a position by issuing a placement instruction. The creator-user 902 may perform this task by issuing a voice command (e.g., by speaking the command "place anchor" or the like, or by performing a physical gesture, such as an air tap). The input processing component 610 includes functionality for detecting the creator-user's telltale selection behavior. Finally, the position-defining component 802 stores the anchor position selected by the creator-user in the data store 620.

In other implementations, the position-defining component 802 can allow the user to specify the anchor's position by performing a pointing gesture, or by manipulating a separate controller, etc. The controller can include an IMU that detects its position and orientation with six degrees of freedom.

Illustrative background information regarding technology that can be leveraged to perform aspects of the above-identified tasks is described, for instance, in: U.S. Patent Application No. 20160026242 to Burns, et al., published on Jan. 28, 2016, and entitled "Gaze-Based Object Placement within a Virtual Reality Environment"; U.S. Patent Application No. 20160048204 to Scott, et al., published on Feb. 18, 2016, and entitled "Gaze Swipe Selection"; and U.S. Patent Application No. 20170061694 to Giraldi, et al., published on Mar. 2, 2017, and entitled "Augmented Reality Control of Computing Device."

Returning to FIG. 8, a property-defining component 804 allows a creator-user to select other information items associated with the anchor that has been placed. For example, the property-defining component 804 can allow the creator-user to supply this information via a user interface presentation 806. The user interface presentation 806 allows the creator-user, for instance, to specify the application associated with the anchor, the triggering condition(s) associated with the anchor, the permission information associated with the anchor, and so on.

The above-described process is manual in nature. In another implementation, an automated annotation creation component (not shown) can automatically add instances of application annotation information to an interactive space based on one or more factors. For example, with reference to FIG. 1, the automated annotation creation component can determine that many users manually search for a particular type of application near the entrance of the Coliseum. The automated annotation creation component can determine that this usage exceeds a prescribed threshold, and then, in response, automatically add an anchor to the entrance region, and associate that application with the frequently-used application. The automated annotation creation component can then associate appropriate triggering information with the anchor. For example, if the automated annotation creation component detects that many users use the application within a 100-meter radius of the entrance, then it can set up an appropriate spatial triggering condition that specifies a 100-meter radius, relative to the location of the anchor. If the automated annotation creation component detects that most users use the application between 8:00 AM to 5:00 PM on weekdays, then it can set up an appropriate temporal triggering condition that specifies this span of time, and so on.

Although not shown, the annotation creation component 618 can include a sharing component that permits a user to share an instance of application annotation information with another person. That sharing component can serialize the instance of application annotation information and send it to the other person's computing device (e.g., the other person's HMD) via the communication component 638 in direct peer-to-peer fashion, or by sharing it via a network-accessible data store. A user can share an instance of application annotation information regardless of whether the user was the original creator of that instance of application annotation information.

Figure 10:
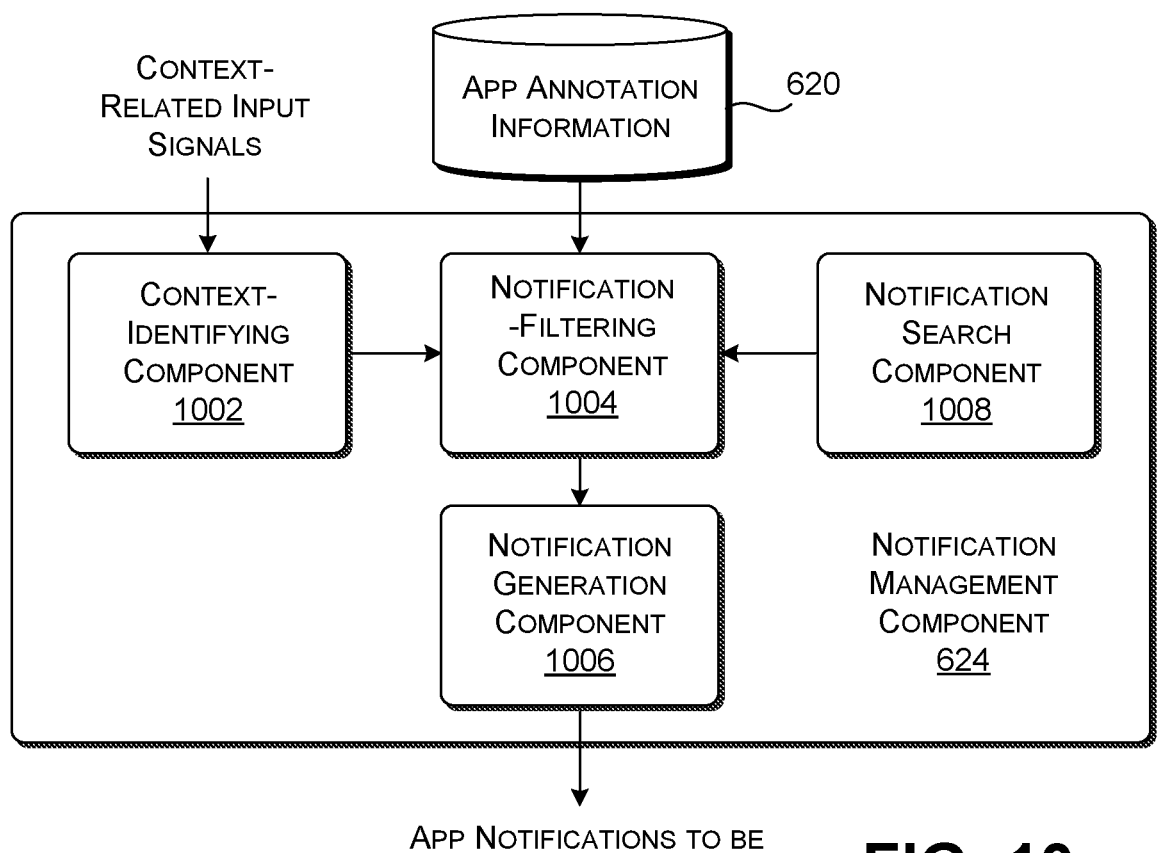
FIG. 10 shows one implementation of a notification management component, which is another element of the AAF of FIG. 6.

FIG. 10 shows one implementation of the notification management component 624. The notification management component 624 identifies a subset of notifications to present, selected from a larger universe of candidate notifications. Each notification is associated with an underlying anchor that has been placed within the interactive world.

A context-identifying component 1002 identifies a current context of the user within the interactive world based on input signals provided by the input devices 608, and/or processed input information provided by the input processing component 610. For example, the context-identifying component 1002 can identify the current location of the user based on raw position information provided by any of an IMU, a GPS system, a beacon-sensing system, a wireless triangulation system, a dead-reckoning system, a near-field-communication (NFC) system, etc. Alternatively, or in addition, the context-identifying component 1002 can identify the current location of the user based on location information provided by the map processing component 612.

The context-identifying component 1002 can also identify a volume of space in the interactive world with which the user is currently interacting. For example, with reference to FIG. 1, the volume of space includes a portion of the Coliseum 104 that is currently observable to the user 102, which is dependent on the current detected position of the user 102 and the viewing frustum provided by the scene presentation component 626.

The context-identifying component 1002 can identify the current time and date (and any other temporal factor) by making reference to a clock, calendar, etc. The context-identifying component 1002 can identify demographic characteristics of the user by making reference to a user profile of the user stored in a data store. The context-identifying component 1002 can identify the co-presence of another person based on position information providing by that other person's complementary context-identifying component, and/or by directly sensing the presence of that person (e.g., based on image information captured by a camera, NFC information, etc.).

The context-identifying component 1002 can determine whether the user has performed a telltale invoking action (such as opening the bin 206 in the user scenario of FIG. 6) based on sensor signals provided by sensors placed in the environment 606. Alternatively, or in addition, the context-identifying component 1002 can receive image information (from cameras) that captures the user's movements in the environment 606. The context-identifying component 1002 can then apply pattern-matching technology (e.g., a machine-learned model) to the image information to detect when the user has performed a telltale action.

A notification-filtering component 1004 determines notifications to present at any given time based on the context information provided by the context-identifying component 1002 and the triggering information specified in the application annotation information. In one implementation, the notification-filtering component 1004 can first identify the collection of candidate anchors that are present within the volume of space that is currently available to the user. For instance, with respect to FIG. 1, the notification-filtering component 1004 can identify the candidate anchors 110, 112, and 114. The notification-filtering component 1004 can then examine the triggering condition(s) associated with each of those candidate anchors (110, 112, 114) to determine which notifications should be enabled. For instance, with reference to FIG. 1, the notification-filtering component 1004 will determine that the notification 118 associated with the anchor 110 should be displayed when all of its triggering conditions are satisfied.

The notification-filtering component 1004 can filter notifications in other ways compared to that described above. For example, in another implementation, the notification-filtering component 1004 can examine all of the anchors in the data store 620 to determine which notifications should be activated, that is, without first identifying a subset of anchors that are included within the volume of space currently being viewed by the user.

A notification generation component 1006 generates a notification for each anchor that passes the above-described relevance test. The notification generation component 1006 can perform this task by placing a notification within the interactive world at a prescribed location relative to the anchor. For instance, the notification generation component 1006 can place the notification at the same position as the anchor, or at a fixed offset from the anchor.

The notification generation component 1006 can also take one or more contextual factors into account in determining where to place the notification. For example, the notification generation component 1006 can place the notification as close to its anchor as possible, while also minimizing the extent to which the notification interferes with other notifications and scene content in the interactive world.

In an alternative implementation, a notification search component 1008 allows the user to perform a manual search of available notifications. For example, advancing to FIG. 11, the notification search component 1008 allows the user to specify search conditions through a user interface presentation 1102. The search conditions operate as supplemental triggering conditions. In some cases, the search conditions supplement and further restrict the existing triggering conditions specified in the application annotation information. In other cases, the search conditions override and/or broaden the existing triggering conditions specified in the application.

Figures 11, 12:
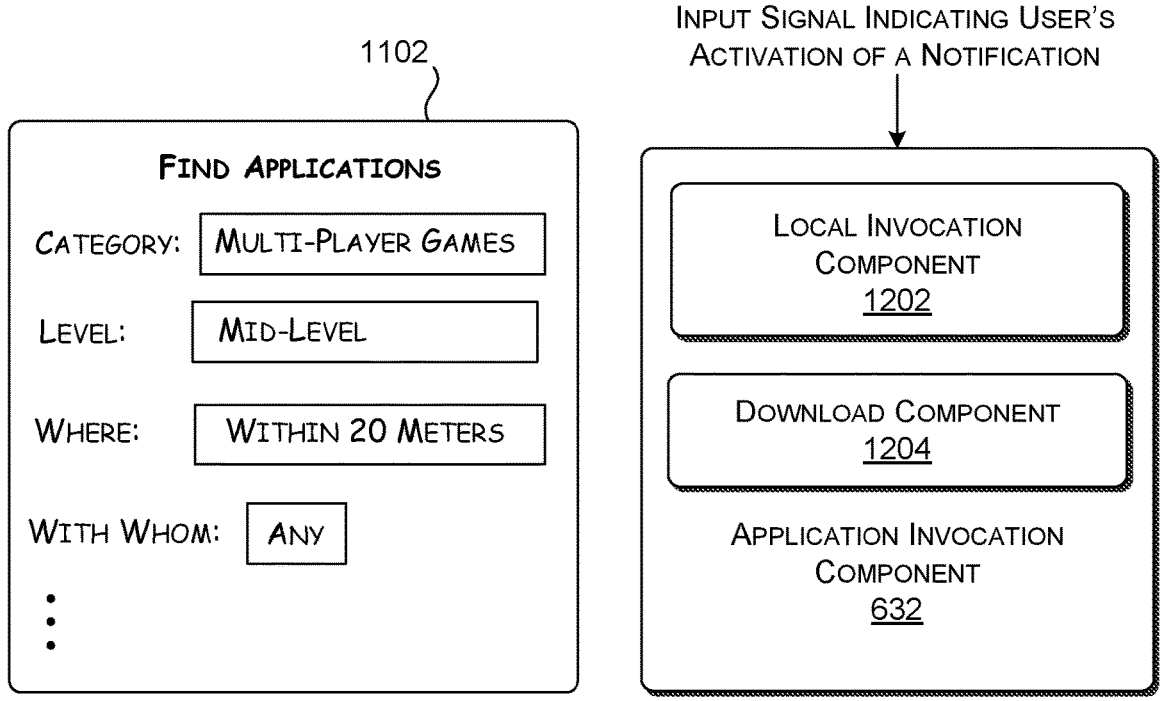
FIG. 11 shows one implementation of a search-related user interface presentation, which is provided by the notification management component of FIG. 10.
FIG. 12 shows one implementation of an application invocation component, which is another element of the AAF of FIG. 6.

In the merely illustrative example of FIG. 11, the user interface presentation 1102 allows the user to specify the category of notifications that is being sought, the skill level of the applications being sought, the desired location of the anchors associated with the applications being sought, the local/remote status of the applications being sought, the multi-player/single-player status of the applications being sought, and so on. The notification-filtering component 1004 responds to the search request by performing a filtering operation based on the original application annotation information in conjunction with the search conditions specified in the search request. This search operation may have the effect of restricting or expanding the group of notifications that were available to the user, prior to performing the search.

The user may also interact with a configuration user interface presentation (not shown) to more generally control the manner in which notifications are presented as the user interacts with a world. For example, the configuration user interface presentation can allow the user to enable or disable the AAF's notification presentation behavior in wholesale fashion. Alternatively, or in addition, the configuration user interface presentation can allow the user to enable or disable the presentation of notifications for a certain class of notifications (defined with respect to any factor(s)). The configuration user interface can also define notification-throttling and spam-management properties. For instance, the configuration user interface presentation can allow the user to specify that no more than a prescribed number of the highest-ranked notifications should be presented at any given time. Notifications can be ranked using any criteria, such as the popularity ratings of the underlying applications. Alternatively, or in addition, the configuration user interface presentation can allow the user to specify notification-related restrictions on a contextual basis, e.g., by specifying that no notifications should be displayed in certain regions, or upon the detection of certain critical events, and so on.

FIG. 12 shows one implementation of the application invocation component 632. The application invocation component 632 attempts to invoke an application when the user selects the application's corresponding notification within the interactive world. The application invocation component 632 includes a local invocation component 1202 for invoking a local application stored in the local data store 620. The application invocation component 632 also includes a download component 1204 for downloading an application that is not currently stored in the local data store 620. Although not shown, the application invocation component 632 can also activate a remote application without first downloading it.

FIG. 13 shows one implementation of the input processing component 610. The input processing component 610 includes a voice command recognition component 1302 for interpreting a user's command. The voice command recognition component 1302 can use any technology for performing this task, such as a neural network or Hidden Markov Model (HMM) which maps voice input signals to a classification result; the classification result identifies the command spoken by the user, if any.

A gaze detection component 1304 determines the gaze of the user (and the objects selected thereby) using known technology, examples of which were provided above.

A gesture detection component 1306 determines whether the user has performed a telltale gesture, or whether the movement of any other object in the interactive world conforms to a telltale gesture. The gesture detection component 1306 can perform this task using known pattern-matching technology, such as that described in: U.S. Pat. No. 7,996,793 to Latta, et al., published on Aug. 9, 2011, and entitled "Gesture Recognizer System Architecture," and U.S. Patent Application No. 20120162065 to Tossell, et al., published on Jun. 28, 2012, and entitled "Skeletal Joint Recognition and Tracking System."

The input processing component 610 can alternatively include other types of detection components. For instance, although not shown, the input processing component 610 can include a controller detection component for interpreting control signals supplied by a separate controller.

C. Illustrative Process

FIG. 14 shows a process 1402 that explains the operation of the application annotation framework (AAF) 602 of Sections B in flowchart form. Since the principles underlying the operation of the AAF 602 have already been described in Section B, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1404, the AAF 602 provides a data store 620 of application annotation information that identifies: an anchor; a location at which the anchor is virtually placed in an interactive world; an application associated with the anchor; and trigger information that describes a set of one or more triggering conditions to be satisfied to enable presentation of a notification pertaining to the application. In block 1406, the AAF 602 identifies a current context in which a user is engaging the interactive world, while simultaneously presenting a representation of the interactive world on a display device. In block 1408, the AAF 602 determines, based on the current context, whether the set of triggering conditions associated with the anchor has been satisfied. In block 1410, if the set of triggering conditions has been satisfied, the AAF 602 presents the notification pertaining to the application in prescribed proximity to the anchor, within the representation of the interactive world. In block 1412, the AAF receives an input signal from an input device that indicates that the user has activated the notification. In block 1414, in response to receiving the input signal, the AAF 602 invokes the application, to provide an application experience.

D. Representative Computing Functionality

FIG. 15 shows a head-mounted display (HMD) 1502, which can be used to implement at least parts of the AAF 602 of FIG. 6, such as the group of components previously identified as the HMD 604. The HMD 1502 includes a head-worn frame that houses or otherwise affixes a see-through display device 1504. Or when used in a fully immersive environment, the display device 1504 can include an opaque (non-see-through) display device. Waveguides (not shown) or other image information conduits direct left-eye images to the left eye of the user and direct right-eye images to the right eye of the user, to overall create the illusion of depth through the effect of stereopsis. Although not shown, the HMD 1502 can also include speakers for delivering sounds to the ears of the user.

The HMD 1502 can include any environment-facing cameras, such as representative environment-facing cameras 1506 and 1508. The cameras (1506, 1508) can include RGB cameras, a depth camera system, etc. While FIG. 15 shows only two cameras (1506, 1508), the HMD 1502 can include any number of cameras of different camera type(s).

The HMD 1502 can include an inward-facing gaze-tracking system. For example, the inward-facing gaze-tracking system can include light sources (1510, 1512) for directing light onto the eyes of the user, and cameras (1514, 1516) for detected the light reflected from the eyes of the user.

The HMD 1502 can also include other input mechanisms, such as one or more microphones 1518, an inertial measurement unit (IMU) 1520, etc. The IMU 1520, in turn, can include one or more accelerometers, one or more gyroscopes, one or more magnetometers, etc., or any combination thereof.

Background information regarding the general topic of HMD display and sensor hardware can be found, for instance in U.S. Patent Application No. 20160210780 to Paulovich, et al., published on Jul. 21, 2016, and entitled, "Applying Real-World Scale to Virtual Content."

A controller 1522 can include logic for performing any of the tasks described above in FIG. 6. For example, the controller 1522 can include all or some of the processing-related components illustrated in FIG. 6 within the dashed-line box, and attributed to the HMD 604.

The controller 1522 may interact with other computing devices via the communication component 638 (shown in FIG. 6). The other computing components can include the annotation creation component 618, remote applications 636, other computing devices 640 operated by other respective users (e.g., other HMDs), a remote data store 622 that provides remote application annotation information, and so on.

Figure 16:
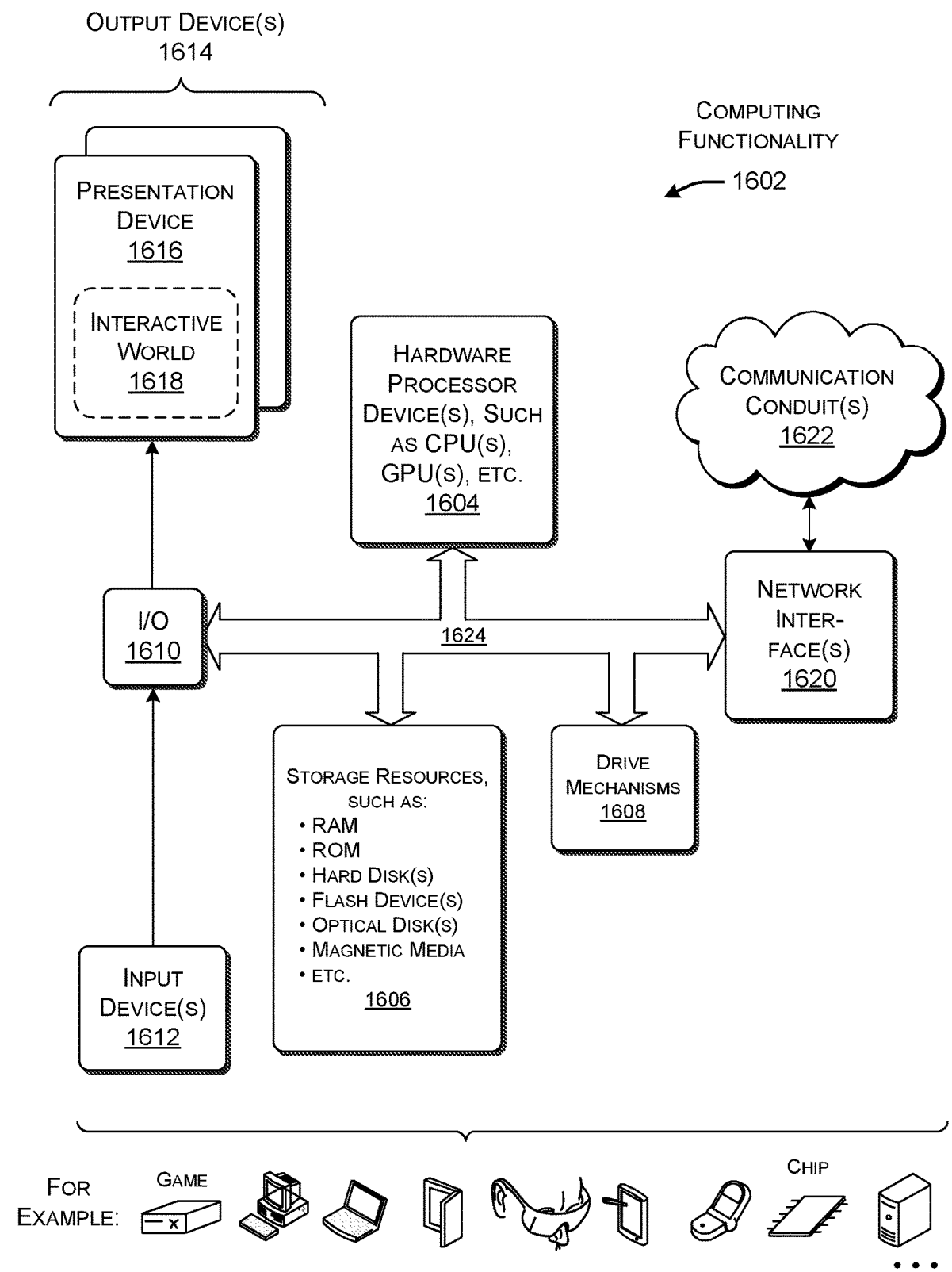
FIG. 16 shows illustrative computing functionality that can be used to implement any aspect of the features shown in the foregoing drawings.

FIG. 16 more generally shows computing functionality 1602 that can be used to implement any aspect of the mechanisms set forth in the above-described figures. For instance, the type of computing functionality 1602 shown in FIG. 16 can be used to implement the HMD 1502 of FIG. 15, or the handheld computing device 414 shown in FIG. 4, or a separate computing device that is used to implement the annotation creation component 618, and so on. In all cases, the computing functionality 1602 represents one or more physical and tangible processing mechanisms.

The computing functionality 1602 can include one or more hardware processor devices 1604, such as one or more central processing units (CPUs), and/or one or more graphics processing units (GPUs), and so on. The computing functionality 1602 can also include any storage resources (also referred to as computer-readable storage media or computer-readable storage medium devices) 1606 for storing any kind of information, such as machine-readable instructions, settings, data, etc. Without limitation, for instance, the storage resources 1606 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1602. The computing functionality 1602 may perform any of the functions described above when the hardware processor device(s) 1604 carry out computer-readable instructions stored in any storage resource or combination of storage resources. For instance, the computing functionality 1602 may carry out computer-readable instructions to perform each block of the process 1402 shown in FIG. 14. The computing functionality 1602 also includes one or more drive mechanisms 1608 for interacting with any storage resource, such as a hard disk drive mechanism, an optical disk drive mechanism, and so on.

The computing functionality 1602 also includes an input/output component 1610 for receiving various inputs (via input devices 1612), and for providing various outputs (via output devices 1614). Illustrative input devices and output devices were described above in the context of the explanation of FIGS. 6 and 15. For instance, the input devices 1612 can include any combination of video cameras, a depth camera system, microphones, an IMU, etc. The output devices 1614 can include a display device 1616 that presents an interactive world 1618, speakers, etc. The computing functionality 1602 can also include one or more network interfaces 1620 for exchanging data with other devices via one or more communication conduits 1622. One or more communication buses 1624 communicatively couple the above-described components together.

The communication conduit(s) 1622 can be implemented in any manner, e.g., by a local area computer network, a wide area computer network (e.g., the Internet), point-to-point connections, etc., or any combination thereof. The communication conduit(s) 1622 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1602 (and its hardware processor(s)) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method, implemented by one or more computing devices, is described for providing notifications. The method includes providing a data store of application annotation information that identifies: an anchor; a location at which the anchor is virtually placed in an interactive world generated by the computing device(s); an application associated with the anchor; and trigger information that describes a set of one or more triggering conditions to be satisfied to enable presentation of a notification pertaining to the application. The method also includes: identifying a current context in which a user is engaging the interactive world, while simultaneously presenting a representation of the interactive world on a display device; determining, based on the current context, whether the set of triggering conditions associated with the anchor has been satisfied; if the set of triggering conditions has been satisfied, presenting the notification in prescribed proximity to the anchor, within the representation of the interactive world; receiving an input signal from an input device that indicates that the user has activated the notification; and, in response to the receiving of the input signal, invoking the application, to provide an application experience.

According to a second aspect, the display device is associated with a head-mounted display.

According to a third aspect, the display device is associated with a handheld computing device.

According to a fourth aspect, the anchor is placed in the interactive world at a static position, and the location contained in the data store describes the static position.

According to a fifth aspect, the anchor is placed in the interactive world in relation to a movable object, and the location contained in the data store describes the movable object.

According to a sixth aspect, the set of triggering conditions includes a spatial triggering condition that specifies that the user is permitted to receive the notification when the user moves to a position within the interactive world that has a prescribed spatial relationship with respect to the anchor.

According to a seventh aspect, the set of triggering conditions includes a temporal triggering condition that specifies that the user is permitted to receive the notification when the user performs a prescribed action within a specified timeframe.

According to an eighth aspect, the set of triggering conditions includes a user co-presence triggering condition that specifies that the user is permitted to receive the notification when the user and at least one other person, besides the user, are within a prescribed zone within the interactive world.

According to a ninth aspect, the set of triggering conditions includes an action-related triggering condition that specifies that the user is permitted to receive the notification when the user performs a prescribed action with respect to an object within the interactive world.

According to a tenth aspect, the above-referenced prescribed action corresponds to moving the object to reveal a previously concealed zone within the interactive world.

According to an eleventh aspect, the method further includes receiving a search request from the user. The operation of determining whether the set of triggering conditions has been satisfied, and the operation of presenting the notification, is performed in response to the operation of receiving the search request.

According to a twelfth aspect, the invoking operation includes invoking a local application provided in a local data store.

According to a thirteenth aspect, the invoking operation includes downloading an application from a remote data store, and then invoking the application.

According to a fourteenth aspect, the application annotation information is received from an annotation creation component in response to an annotation creation operation performed by a user.

According to a fifteenth aspect, a computing device (or devices) is described for providing notifications. The computing device(s) includes a data store that provides application annotation information that identifies: an anchor; a location at which the anchor is virtually placed in an interactive world generated by the computing device(s); an application associated with the anchor; and triggering information that describes a set of triggering conditions to be satisfied to enable presentation of a notification pertaining to the application. The set of triggering conditions specifies: at least one spatial zone within the interactive world in which the user is permitted to receive the notification; and/or at least one timeframe within which the user is permitted to receive the notification. The computing device(s) also includes: an input processing component configured to detect interaction by the user with the interactive world, based on input signals provided by one or more input devices; and a scene presentation component configured to display a representation of the interactive world to the user on a display device, in response to interaction by the user with the interactive world. The computing device(s) also includes: a context-identifying component configured to identify a current context in which a user is engaging the interactive world; a notification-filtering component configured to determine, based on the current context, whether the set of triggering conditions associated with the anchor has been satisfied; and a notification generation component configured to, if the set of triggering conditions has been satisfied, generate the notification pertaining to the application, and instruct the scene presentation component to present the notification in prescribed proximity to the anchor, within the representation of the interactive world. The computing device(s) also includes an application invocation component configured to receive an input signal from an input device that indicates that the user has activated the notification, and, in response to receiving the input signal, invoke the application to provide an application experience.

According to a sixteenth aspect, the set of triggering conditions (recited in the fifteenth aspect) specifies both the above-referenced at least one spatial zone and the above-referenced at least one timeframe.

According to a seventeenth aspect, the set of triggering conditions (recited in the fifteenth aspect) also includes a user co-presence triggering condition that specifies that the user is permitted to receive the notification when the user and at least one other person, besides the user, are within a prescribed zone within the interactive world.

According to an eighteenth aspect, the set of triggering conditions (recited in the fifteenth aspect) also includes an action-related triggering condition that specifies that the user is permitted to receive the notification when the user performs a prescribed action with respect to an object within the interactive world.

According to a nineteenth aspect, a computer-readable storage medium for storing computer-readable instructions is described. The computer-readable instructions, when executed by one or more processor devices, perform a method that includes: identifying a current context in which a user is engaging an interactive world, while simultaneously presenting a representation of the interactive world on a display device; determining, based on the current context, whether the user has moved, within a prescribed timeframe, to assume a prescribed spatial relationship with respect to an anchor that has been virtually placed in the interactive world, wherein an application is associated with the anchor; if the user is determined to have moved to assume the prescribed spatial relationship within the prescribed timeframe, presenting a notification pertaining to the application in prescribed proximity to the anchor, within the representation of the interactive world; receiving an input signal from an input device that indicates that the user has activated the notification; and, in response to the operation of receiving of the input signal, invoking the application to provide an application experience.

According to a twentieth aspect, the notification (recited in the nineteenth aspect) is only presented in response to an additional determination that at least one person, besides the user, is present within a prescribed zone within the interactive world.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
    identifying a field of view of a user within an interactive world;
    identifying a subset of anchors that fall within the field of view and a corresponding subset of executable applications associated with the subset of anchors that fall within the field of view;
    determining, based at least on a current context of the user, whether triggering conditions for the executable applications of the subset have been satisfied;
    responsive to satisfaction of one or more first triggering conditions for a first executable application having a first anchor within the field of view of the user, presenting a first notification pertaining to the first executable application in a representation of the interactive world while suppressing a second notification pertaining to a second executable application having a second anchor within the field of view of the user;
    detecting that the user has activated the first notification; and
    in response to detecting that the user has activated the first notification, invoking the first executable application.

2. The method of claim 1, further comprising:
    identifying a third anchor associated with an object in the interactive world, the third anchor being associated with a third executable application having a third triggering condition that specifies a user action that involves moving the object;
    detecting that the user has satisfied the third triggering condition when the user performs the user action by moving the object;
    responsive to satisfaction of the third triggering condition, presenting a third notification pertaining to the third executable application in the representation of the interactive world; and
    in response to detecting that the user has activated the third notification, invoking the third executable application.

3. The method of claim 2, the object being a physical object.

4. The method of claim 3, further comprising:
    analyzing image information that captures the physical object to detect when the user performs the user action by moving the physical object.

5. The method of claim 1, further comprising:
identifying a third anchor associated with an object in the interactive world, the third anchor being associated with a third executable application having a third triggering condition that involves the presence of a specified number of users within a prescribed distance of the third anchor;
detecting that the third triggering condition has been satisfied when the specified number of users, including the user and one or more other users, are within the prescribed distance of the third anchor;
responsive to satisfaction of the third triggering condition, presenting a third notification pertaining to the third executable application in the representation of the interactive world; and
in response to detecting that the user has activated the third notification, invoking the third executable application.

6. The method of claim 5, wherein the third executable application is a multi-user application configured to concurrently provide a shared application experience to the user and the one or more other users.

7. The method of claim 1, further comprising:
identifying a third anchor associated with a moveable object in the interactive world, the third anchor being associated with a third executable application having an associated third triggering condition;
tracking movement of the moveable object within the interactive world and moving the third anchor with the moveable object;
based at least on the tracking the movement of the moveable object, detecting that the third triggering condition has been satisfied;
responsive to satisfaction of the third triggering condition, presenting a third notification pertaining to the third executable application in the representation of the interactive world; and
in response to detecting that the user has activated the third notification, invoking the third executable application.

8. The method of claim 7, wherein the third triggering condition specifies that the user is within a prescribed distance of the moveable object.

9. The method of claim 1, further comprising:
suppressing the second notification when a second triggering condition associated with the second executable application is not satisfied.

10. A system comprising:
a presentation device;
a hardware processor; and
a computer-readable storage medium storing computer-readable instructions which, when executed by the hardware processor, cause the hardware processor to:
present an interactive world on the presentation device;
receive user input via user interaction of a user with the interactive world, the user input specifying a position of an anchor within the interactive world;
receive further user input specifying an application associated with the anchor and a triggering condition, the triggering condition specifying circumstances under which a notification of the application is presented in the interactive world; and
populate a data store with annotation information that identifies the position of the anchor, the application, and the triggering condition.

11. The system of claim 10, wherein the computer-readable instructions, when executed by the hardware processor, cause the hardware processor to:
identify the position of the anchor based at least on a direction of the user's gaze in the interactive world.

12. The system of claim 11, the presentation device comprising a head-mounted display.

13. The system of claim 10, wherein the computer-readable instructions, when executed by the hardware processor, cause the hardware processor to:
identify the position of the anchor based at least on a gesture performed by the user.

14. The system of claim 10, the triggering condition specifying that the notification is displayed within the interactive world when another user comes within a specified distance of the anchor.

15. The system of claim 10, the triggering condition specifying a time period during which the notification is displayed within the interactive world.

16. The system of claim 10, wherein the computer-readable instructions, when executed by the hardware processor, cause the hardware processor to:
identify a current context of another user that is engaging the interactive world;
determine, based at least on the current context of the another user, whether the triggering condition has been satisfied; and
responsive to satisfaction of the triggering condition, present the notification of the application in the interactive world.

17. The system of claim 16, wherein the computer-readable instructions, when executed by the hardware processor, cause the hardware processor to:
detect that the another user has activated the notification; and
in response to detecting that the user has activated the notification, invoke the application.

18. A computer-readable storage medium storing computer-readable instructions which, when executed by a hardware processor, cause the hardware processor to perform acts comprising:
accessing a data store of application annotation information that identifies anchors associated with applications, the anchors having corresponding locations within an interactive world;
determining a context of a user and a field of view of the user as the user interacts with the interactive world;
based at least on the context of the user, presenting individual notifications of individual applications in the interactive world having anchors within the field of view of the user while suppressing presentation of other notifications associated with other applications having anchors within the field of view of the user;
receiving input indicating the user has activated a first notification associated with a first application; and
in response to detecting that the user has activated the first notification, invoking the first application.

19. The computer-readable storage medium of claim 18, the acts further comprising:
determining that a specific application having a specific anchor within the field of view of the user is not pertinent to the context of the user; and
suppressing presentation of a specific notification associated with the specific application.

20. The computer-readable storage medium of claim 19, the acts further comprising:
   identifying at least one of an age, skill level, or subject matter interest of the user expressed by the context of the user; and
   determining that the specific application is not pertinent to the user based at least on the age, skill level, or subject matter interest of the user.

21. The computer-readable storage medium of claim 18, the acts further comprising:
   receiving a search request from the user requesting a search for least one notification characteristic; and
   responsive to receiving the search request, suppressing presentation of further notifications that lack the at least one notification characteristic.

* * * * *